United States Patent
Takeuchi et al.

(10) Patent No.: US 11,011,776 B2
(45) Date of Patent: May 18, 2021

(54) LITHIUM-ION-CONDUCTIVE CERAMIC MATERIAL, LITHIUM-ION-CONDUCTIVE CERAMIC SINTERED BODY, AND LITHIUM BATTERY

(71) Applicant: NGK SPARK PLUG CO., LTD., Nagoya (JP)

(72) Inventors: Yuki Takeuchi, Komaki (JP); Hirofumi Ando, Nishio (JP); Daisuke Shishihara, Kounan (JP); Hidetoshi Mizutani, Ama (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 35 days.

(21) Appl. No.: 15/858,362

(22) Filed: Dec. 29, 2017

(65) Prior Publication Data

US 2018/0269526 A1    Sep. 20, 2018

Related U.S. Application Data

(60) Provisional application No. 62/471,763, filed on Mar. 15, 2017.

(51) Int. Cl.
  *H01M 10/0562*    (2010.01)
  *C04B 35/48*    (2006.01)
  (Continued)

(52) U.S. Cl.
  CPC ......... *H01M 10/0562* (2013.01); *C04B 35/48* (2013.01); *C04B 35/486* (2013.01);
  (Continued)

(58) Field of Classification Search
  CPC .. H01M 10/0562; H01M 4/62; H01M 10/052; H01M 10/0525; C04B 35/48;
  (Continued)

(56) References Cited

U.S. PATENT DOCUMENTS

2010/0047696 A1    2/2010  Yoshida et al.
2010/0203383 A1    8/2010  Weppner
(Continued)

FOREIGN PATENT DOCUMENTS

JP    2010534383 A    11/2010
JP     5132639 B2     3/2011
(Continued)

OTHER PUBLICATIONS

Kihira et al., Simultaneous substituion in high lithium ion conducting garnet-type oxides; Li7+xLa3-yAyZr2-zNbzO12 (A=Sr, Ca), 2013,The Electrochemistry Society, Abstrate #1196, 224th EOS Meeting (Year: 2013).*

(Continued)

*Primary Examiner* — Helen Oi K Conley
(74) *Attorney, Agent, or Firm* — Stites & Harbison, PLLC; Jeffrey A. Haeberlin; Terry L. Wright

(57) ABSTRACT

[OBJECTS]
An object of the present invention is to provide a lithium-ion-conductive ceramic material having a target ion conductivity, while suppressing production cost. Another object is to provide a high-performance lithium battery, while suppressing production cost, by virtue of having the lithium-ion-conductive ceramic material.

The lithium-ion-conductive ceramic material contains Li, La, and Zr, as well as at least one of Mg and A (wherein A represents at least one element selected from the group consisting of Ca, Sr, and Ba) and which has a garnet-type crystal structure, wherein the elements contained in the ceramic material satisfy the following mole ratio conditions (1) to (3): (1) $1.33 \leq \text{Li}/(\text{La}+\text{A}) \leq 3$; (2) $0 < \text{Mg}/(\text{La}+\text{A}) \leq 0.5$; and (3) $0 < \text{A}/(\text{La}+\text{A}) \leq 0.67$, and a lithium battery employing the ceramic material.

15 Claims, 5 Drawing Sheets

(51) Int. Cl.

| | |
|---|---|
| *C04B 35/626* | (2006.01) |
| *C04B 35/64* | (2006.01) |
| *H01M 10/0525* | (2010.01) |
| *C04B 35/486* | (2006.01) |
| *H01M 4/62* | (2006.01) |
| *H01M 10/052* | (2010.01) |

(52) U.S. Cl.
CPC .... *C04B 35/6262* (2013.01); *C04B 35/62675* (2013.01); *C04B 35/64* (2013.01); *H01M 4/62* (2013.01); *H01M 10/052* (2013.01); *H01M 10/0525* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3227* (2013.01); *C04B 2235/3248* (2013.01); *C04B 2235/604* (2013.01); *C04B 2235/6567* (2013.01); *C04B 2235/6587* (2013.01); *C04B 2235/764* (2013.01); *C04B 2235/77* (2013.01); *C04B 2235/80* (2013.01); *C04B 2235/96* (2013.01); *H01M 2300/0071* (2013.01); *H01M 2300/0094* (2013.01); *Y02T 10/70* (2013.01)

(58) Field of Classification Search
CPC .............. C04B 35/486; C04B 35/6262; C04B 35/62675; C04B 35/64; C04B 2235/3203; C04B 2235/3213; C04B 2235/3215; C04B 2235/3227; C04B 2235/3248; C04B 2235/604; C04B 2235/6567; C04B 2235/6587; C04B 2235/764; C04B 2235/77; C04B 2235/80; C04B 2235/85
See application file for complete search history.

(56) References Cited

U.S. PATENT DOCUMENTS

| | | |
|---|---|---|
| 2011/0053000 A1 | 3/2011 | Kanamura et al. |
| 2011/0053002 A1 | 3/2011 | Yamamura et al. |
| 2011/0244337 A1 | 10/2011 | Ohta et al. |
| 2014/0205910 A1 | 7/2014 | Weppner et al. |
| 2014/0377665 A1 | 12/2014 | Yoshida et al. |
| 2016/0268629 A1* | 9/2016 | Tanaka .............. H01M 10/0562 |

FOREIGN PATENT DOCUMENTS

| | | |
|---|---|---|
| JP | 5376252 B2 | 4/2011 |
| JP | 2012031025 A | 2/2012 |
| JP | 5083336 B2 | 11/2012 |
| JP | 2013032259 A | 2/2013 |
| JP | 5525388 B2 | 6/2014 |
| WO | 2013/128759 A1 | 9/2013 |

OTHER PUBLICATIONS

Thangadurai, V., et al. Garnet-Type Solid-State Fast Li Ion Conductors for Li Batteries: Critical Review, Chemical Society Reviews, Mar. 2014 (hereinafter the "Critical Review article").

Jalem, R., et al. Effects of Gallium Doping in Garnet-Type Li7LA3Zr2O12 Solid Electroyltes, Chem. Mater. 2015, 27, 2821-2831.

Li, Y., et al. Ionic Distribution and Conductivity in Lithium Garnet Li7La3Zr2O12, Journal of Power Sources 209 (2012) 278-281.

Niarayanan, S., et al. Effect of Y Substitution for Nb in Li5La3Nb2O12 on Li Ion Conductivity of Garnet-type Solid Electrolytes, Journal of Power Sources 196 (2011) 8085-8090.

Xie, H., et al. Low-temperature synthesis of Li7LA3Zr2O12 with Cubic Garnet-type Structure, Materials Research Bulletin 47 (2012) 1229-1232.

Murugan, R., et al. Fast Lithium Ion Conduction in Garnet-Type Li7LA3Zr2O12, Angew. Chem Int. Ed. 2007, 46, 7778-7781.

* cited by examiner (1) (3)

(1) (3) (2)

(2) (1) (3)

(2) (1) (3)

(3) (2) (1)

LITHIUM-ION-CONDUCTIVE CERAMIC MATERIAL, LITHIUM-ION-CONDUCTIVE CERAMIC SINTERED BODY, AND LITHIUM BATTERY

TECHNICAL FIELD

The present invention relates to a lithium-ion-conductive ceramic material, to a sintered product of a lithium-ion-conductive ceramic material (hereinafter referred to as a lithium-ion-conductive ceramic sintered body), and to a lithium battery.

BACKGROUND ART

In recent years, active uses of electronic apparatuses including personal computers and cellular phones as well as electrically-powered automobiles, and development in natural (renewable) energy storing technique have invoked increasing demand for high-performance batteries of a high level of safety and a long service life. Conventionally, some lithium ion secondary batteries employ an organic electrolyte layer produced by dissolving a lithium salt in an organic solvent. However, such batteries having a liquid-based organic electrolyte layer have hazards, including leakage of organic solvent, flashing, and explosion, which are not preferred from safety aspects. In order to ensure a high level of safety, complete-solid batteries have been extensively developed in recent years. The complete-solid batteries employ a solid electrolyte layer instead of a liquid-base organic electrolyte layer, along with other battery elements formed of a solid.

The complete-solid batteries, having a ceramic electrolyte layer, are free from liquid leakage or flashing, ensuring high safety. Also, the complete-solid batteries may adapt a simpler casing as compared with a casing of a lithium ion secondary battery employing a liquid-base organic electrolyte layer, whereby battery elements are stacked. The thus-realized small-scale batteries can provide an enhanced energy density per unit volume or weight. Among such complete-solid batteries, a complete-solid lithium ion secondary battery having an electrode containing metallic lithium is envisaged to realize high energy density. The complete-solid lithium ion secondary batteries must employ an electrolyte layer formed of a specific material which is stable to highly reactive metallic lithium. Under such circumstance, a ceramic material having a garnet-type crystal structure is a promising material for producing solid electrolyte layer having high chemical stability.

Among such electrolyte layer materials, a candidate is a ceramic material having a garnet-type crystal structure represented by $Li_7La_3Zr_2O_{12}$ (hereinafter referred to as LLZ). LLZ mainly has cubic and tetragonal crystal structures. It is reported that cubic-type LLZ exhibits high ion conductivity when a specific element thereof is substituted with another element.

For example, Patent Documents 1 and 2 disclose that LLZ, which intrinsically has low density and an unmeasurably low Li ion conductivity, can be recovered as stable pellets and exhibits high Li ion conductivity, when aluminum (Al) is added to the initial LLZ components (Patent Document 1; claim 1, [0009] and [0076], Patent Document 2; claim 1, [0007] and [0019]).

Patent Document 3 discloses that, through addition of an appropriate amount of Al to a garnet-type lithium-ion-conductive oxide, the conductivity (Li ion conductivity) of the oxide increases, and the activation energy of conductivity decreases, to thereby reduce a variation in conductivity with temperature (Patent Document 3; claim 1 and [0006]).

Patent Document 4 discloses that the Li ion conductivity of an LLZ ceramic material can be enhanced by partially substituting Zr with niobium (Nb) and/or tantalum (Ta) (Patent Document 4; claim 1 and [0009]).

Patent Document 5 discloses that incorporation of Al and Mg as additional elements into a garnet-type LLZ solid electrolyte ceramic material can provide a high-density and high-strength LLZ solid electrolyte ceramic material, while uneven firing, cracking, formation of defects (e.g., pores), anomalous grain growth, etc. are suppressed or prevented (Patent Document 5; claim 1 and [0011]).

Patent Document 6 discloses that, through substituting La site elements of a garnet-type Li—La—Zr oxide with Sr, Ca, or the like and Zr site elements thereof with Nb or the like, a drop in conductivity (Li ion conductivity) of the oxide can be prevented to a maximum extent, and the firing energy of the oxide can be further reduced (Patent Document 6; claim 1 and [0008]).

Patent Document 7 discloses a solid ion conductor having a garnet-like crystal structure, represented by a stoichiometric composition $L_{7+X}A_3G_{3-X}Zr_2O_{12}$ [wherein L represents an independent monovalent cation; A represents an independent divalent cation; G represents an independent trivalent cation; $0 \le X \le 3$; and O represents a partially or completely divalent or trivalent anion which may optionally be substituted with, for example, $N^{3-}$] (Patent Document 7; claim 4). The Examples of the above specification disclose that the total conductivity of $Li_7La_3Zr_2O_{12}$ at room temperature is higher than that of other lithium ion conductors (Patent Document 7; [0052]).

Patent Document 8 discloses "a garnet-type lithium-ion-conductive oxide represented by formula: $Li_{5+X}La_3(Zr_x, A_{2-x})O_{12}$ (wherein A represents at least one element selected from the group consisting of Nb and Ta; and $1.4 \le X < 2$)" (Patent Document 8; claim 1). Patent Document 8 discloses that the garnet-type lithium-ion-conductive oxide exhibits higher conductivity as compared with a known oxide, $Li_7La_3Zr_2O_{12}$, while the chemical stability and potential window are the same therebetween (Patent Document 8; e.g., [0010]).

PRIOR ART DOCUMENTS

Patent Documents

Patent Document 1: Japanese Patent No. 5132639
Patent Document 2: Japanese Patent No. 5376252
Patent Document 3: Japanese Patent Application Laid-Open (kokai) No. 2012-31025
Patent Document 4: Japanese Patent No. 5525388
Patent Document 5: WO2013/128759, pamphlet
Patent Document 6: Japanese Patent Application Laid-Open (kokai) No. 2013-32259
Patent Document 7: Japanese PCT Patent Kohyo Publication No. 2010-534383
Patent Document 8: Japanese Patent No. 5083336

SUMMARY OF THE INVENTION

Problem to be Solved by the Invention

Meanwhile, $Li_7La_3Zr_2O_{12}$ (LLZ)—a promising ceramic material of the electrolyte layer—must be produced at higher cost, since metal elements of the oxide include expensive elements. Thus, reduction in cost for the development of ceramic materials having high ion conductivity is required to the maximum degree. For example, Patent Documents 4 and 6 disclose that LLZ ceramic materials having high Li ion conductivity can be produced through partially substituting Zr with Nb and/or Ta. However, since the reserves of Nb and Ta in the earth are small, production cost for producing LLZ ceramic materials with high ion conductivity unavoidably increases. Also, there are concerns about reliable supply of Nb and Ta in the future.

Thus, an object of the present invention is to provide a lithium-ion-conductive ceramic material having a target ion conductivity, while suppressing production cost. Another object is to provide a high-performance lithium-ion-conductive ceramic sintered body and a lithium battery, while suppressing production cost, by virtue of the lithium-ion-conductive ceramic material.

Means for Solving the Problems

Accordingly, means for solving the aforementioned problems is:

[1] a lithium-ion-conductive ceramic material which contains Li, La, and Zr, as well as at least one of Mg and A (wherein A represents at least one element selected from the group consisting of Ca, Sr, and Ba) and which has a garnet-type or garnet-like crystal structure, wherein the elements contained in the ceramic material satisfy the following mole ratio conditions (1) to (3):

$$1.33 \leq Li/(La+A) \leq 3; \quad (1)$$

$$0 < Mg/(La+A) \leq 0.5; \text{ and} \quad (2)$$

$$0 < A/(La+A) \leq 0.67. \quad (3)$$

Another means for solving the aforementioned problems is:

[2] a lithium-ion-conductive ceramic material which contains Li, La, Zr, Mg, and A (wherein A represents at least one element selected from the group consisting of Ca, Sr, and Ba) and which has a garnet-type or garnet-like crystal structure, wherein the elements contained in the ceramic material satisfy the following mole ratio conditions (1') to (3'):

$$2.0 \leq Li/(La+A) \leq 2.7; \quad (1')$$

$$0.01 \leq Mg/(La+A) \leq 0.14; \text{ and} \quad (2')$$

$$0.04 \leq A/(La+A) \leq 0.17. \quad (3')$$

Preferred embodiments of [1] or [2] above are as follows:
[3] a lithium-ion-conductive ceramic material as described in [1] above, which contains Li, La, Zr, Mg, and A;
[4] a lithium-ion-conductive ceramic material as described in any one of [1] to [3] above, which has an ion conductivity at room temperature of $1 \times 10^{-5}$ S/cm or higher;
[5] a lithium-ion-conductive ceramic material as described in any one of [1] to [4] above, wherein A is Sr; and
[6] a lithium-ion-conductive ceramic material as described in any one of [1] to [5] above, which has a relative density of 86% or higher.

Still another means for solving the aforementioned problems are as follows:
[7] a lithium-ion-conductive ceramic sintered body which contains a lithium-ion-conductive ceramic material as recited in any one of [1] to [6] above and which has a first crystal phase containing Li and having a garnet-type or garnet-like crystal structure and a second crystal phase containing Li, Mg, Zr, and O;

[8] a lithium-ion-conductive ceramic sintered body as described in [7] above, wherein the first crystal phase contains Li, La, Zr, and Mg;
[9] a lithium-ion-conductive ceramic sintered body as described in [7] or [8] above, wherein the first crystal phase contains Li, La, Zr, Mg, and element A (wherein element A represents at least one element selected from the group consisting of Ca, Sr, and Ba);
[10] a lithium-ion-conductive ceramic sintered body as described in any one of [7] to [9] above, wherein element A is Sr; and
[11] a lithium-ion-conductive ceramic sintered body as described in any one of [7] to [10] above, which includes the second crystal phase at 10 area % or less, as determined in a cross-section of the sintered body.

Yet another means for solving the aforementioned problems are as follows:
[12] a lithium battery comprising a solid electrolyte layer, a cathode layer, and an anode layer, wherein at least one of the solid electrolyte layer, the cathode layer, and the anode layer contains a lithium-ion-conductive ceramic material as recited in any one of [1] to [6] above;
[13] a lithium battery comprising a solid electrolyte layer, a cathode layer, and an anode layer,
which further includes a protective layer between the solid electrolyte layer and the cathode layer, and/or between the solid electrolyte layer and the anode layer,
wherein at least one of the solid electrolyte layer, the cathode layer, the anode layer, and the protective layer contains a lithium-ion-conductive ceramic material as recited in any one of [1] to [6] above;
[14] a lithium battery comprising a lithium-ion-conductive ceramic sintered body as recited in any one of [7] to [11] above, wherein the lithium-ion-conductive ceramic sintered body serves as a solid electrolyte layer or as a protective layer disposed between a solid electrolyte layer and an electrode.

Effects of the Invention

The lithium-ion-conductive ceramic material of the present invention contains Li, La, and Zr, as well as at least one of Mg and A (wherein A represents at least one element selected from the group consisting of Ca, Sr, and Ba) and which has a garnet-type or garnet-like crystal structure, wherein the elements contained in the ceramic material satisfy specific mole ratio conditions. As compared with a similar ceramic material containing only Li, La, and Zr, the lithium-ion-conductive ceramic material of the present invention can be more readily shaped through sintering and provide high ion conductivity. Furthermore, Mg and element A contained in the lithium-ion-conductive ceramic material of the present invention are inexpensive elements, and the estimated amounts thereof in the earth are relatively large. Thus, these elements are expected to be supplied reliably and can suppress production cost.

Also, the lithium-ion-conductive ceramic sintered body of the present invention has a first crystal phase containing Li and having a garnet-type or garnet-like crystal structure and a second crystal phase containing Li, Mg, Zr, and O. Therefore, the lithium-ion-conductive ceramic sintered body of the present invention exhibits higher ion conductivity, as compared with a similar ceramic sintered body produced from a ceramic material containing the first crystal phase and no second crystal phase. A conceivable reason why the lithium-ion-conductive ceramic sintered body of the present invention exhibits high ion conductivity by virtue of the presence of the second crystal phase will next be described. Firstly, since the lithium-ion-conductive ceramic sintered body has an Li-containing second crystal phase, Li atoms contained in the second crystal phase preferentially become volatile during firing, and the Li content of the highly ion conductive first crystal phase is maintained at a constant level, whereby a consistent ion conductivity can be attained. In addition, a part of the second crystal phase is present in the pores provided in the first crystal phase, and the large-scale pores are filled with the second crystal phase. As a result, mobility of Li ions is enhanced, to thereby attain increased ion conductivity. Therefore, the present invention enables provision of a lithium-ion-conductive ceramic sintered body having high ion conductivity.

In the case where the lithium battery of the present invention includes a solid electrolyte layer, a cathode, and an anode, the lithium-ion-conductive ceramic material having an ion conductivity of interest is contained in at least one of the solid electrolyte layer, the cathode, and the anode, whereby a high-performance lithium battery can be provided. Furthermore, the lithium battery of the present invention is derived partially from relatively inexpensive materials which are reserved in large amounts in the earth, thereby reducing production cost.

Even in the case where a protective layer is disposed between the solid electrolyte layer and the cathode, and/or between the solid electrolyte layer and the anode, the lithium-ion-conductive ceramic material having a target ion conductivity is contained in at least one of the solid electrolyte layer, the cathode, the anode, and the protective layer, whereby a high-performance lithium battery can be provided. Also, the lithium battery of the present invention is derived partially from relatively inexpensive materials which are reserved in large amounts in the earth, thereby reducing production cost.

The lithium battery of the present invention includes a lithium-ion-conductive ceramic sintered body having high ion conductivity, which body serves as a solid electrolyte layer or as a protective layer disposed between a solid electrolyte layer and an electrode, whereby the internal resistance of the lithium battery can be reduced. As a result, the lithium battery of the present invention enables provision of a lithium battery having high capacity and output.

Figure 1:
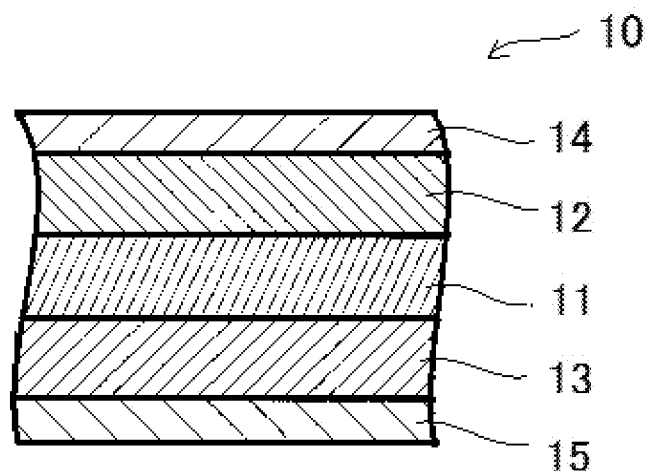
FIG. 1 is a cross-section of a complete-solid battery, which schematically shows an embodiment of the lithium battery of the present invention.

MODES FOR CARRYING OUT THE INVENTION (Lithium-Ion-Conductive Ceramic Material)

An embodiment of the lithium-ion-conductive ceramic material of the present invention will next be described. The lithium-ion-conductive ceramic material of the present invention contains Li, La, and Zr, as well as at least one of Mg and A (wherein A represents at least one element selected from the group consisting of Ca, Sr, and Ba) and which has a garnet-type or garnet-like crystal structure, wherein the elements contained in the ceramic material satisfy the following mole ratio conditions (1) to (3):

$$1.33 \leq Li/(La+A) \leq 3; \quad (1)$$

$$0 < Mg/(La+A) \leq 0.5; \text{ and} \quad (2)$$

$$0 < A/(La+A) \leq 0.67. \quad (3)$$

The lithium-ion-conductive ceramic material of the present invention preferably contains Li, La, Zr, Mg, and A. More preferably, the elements contained in the ceramic material satisfy the following mole ratio conditions (1') to (3'):

$$2.0 \leq Li/(La+A) \leq 2.7; \quad (1')$$

$$0.01 \leq Mg/(La+A) \leq 0.14; \text{ and} \quad (2')$$

$$0.04 \leq A/(La+A) \leq 0.17. \quad (3')$$

As compared with a similar ceramic material containing only Li, La, Zr, and O (oxygen), the lithium-ion-conductive ceramic material of the present invention can be more readily shaped through sintering and provide high ion conductivity. More specifically, a ceramic material formed through firing a mixture containing only an Li component, an La component, and a Zr component having a specific compositional proportions so as to yield a compound represented by the formula (I) hereinbelow was subjected to an analysis by means of an X-ray diffractometer (XRD) at room temperature. As a result, a tetragonal LLZ was identified, but no peak attributed to LLZ having a cubic, or a garnet-type crystal structure (including a garnet-like crystal structure) was identified. The tetragonal LLZ exhibits an ion conductivity as low as about $1 \times 10^{-7}$ S/cm, whereas, in the present invention, a mixture composed of a material containing an Li component, an La component, and a Zr component, a material containing an Mg component, and/or a material containing element A at appropriate compositional proportions is fired, to thereby yield a cubic ceramic material. Through an XRD analysis, the ceramic material is identified to be LLZ having a garnet-type or a garnet-like crystal structure. LLZ having a garnet-type or garnet-like crystal structure exhibits an ion conductivity higher than that of tetragonal LLZ.

$Li_7La_3Zr_2O_{12}$ (LLZ)　　　　　　　　　　formula (I)

Hitherto, there has been reported that LLZ of a garnet-type crystal structure can be formed by incorporating a substitution element including Al, Nb, or Ta into LLZ, to thereby enhance the ion conductivity of the product (see, for example, Patent Documents 1 to 6). The inventors of the present invention have found the following. Specifically, even when LLZ fails to contain a substitution element such as Al, Nb, or Ta, which have been recognized as substitution elements for enhancing ion conductivity, if LLZ contains at least one of Mg and element A, which have not been recognized as such substitution elements, the product exhibits an ion conductivity equal to or higher than that of a partially substituted conventional LLZ. Furthermore, Mg and element A are less expensive than conventionally known substitution elements, Nb and Ta, and are present in larger amounts in the earth. As a result, lithium-ion-conductive ceramic materials are expected to be reliably supplied and produced at reduced cost.

The lithium-ion-conductive ceramic material contains Li, La, and Zr, as well as at least one of Mg and A, wherein these elements satisfy the mole ratio conditions (1) to (3), preferably (1') to (3'). In other words, the lithium-ion-conductive ceramic material satisfies any one of the following (a) to (c), preferably (c), more preferably (d).

(a) The lithium-ion-conductive ceramic material contains Li, La, Zr, and Mg, wherein these elements satisfy the mole ratio conditions: $1.33 \leq Li/La \leq 3$ and $0 < Mg/La \leq 0.5$.

(b) The lithium-ion-conductive ceramic material contains Li, La, Zr, and A, wherein these elements satisfy the mole ratio conditions: $1.33 \leq Li/(La+A) \leq 3$ and $0 < A/(La+A) \leq 0.67$.

(c) The lithium-ion-conductive ceramic material contains Li, La, Zr, Mg, and A, wherein these elements satisfy the mole ratio conditions: $1.33 \leq Li/(La+A) \leq 3$, $0 < Mg/(La+A) \leq 0.5$, and $0 < A/(La+A) \leq 0.67$.

(d) The lithium-ion-conductive ceramic material contains Li, La, Zr, Mg, and A, wherein these elements satisfy the mole ratio conditions: $2.0 \leq Li/(La+A) \leq 2.7$, $0.01 \leq Mg/(La+A) \leq 0.14$, and $0.04 \leq A/(La+A) \leq 0.17$.

When the lithium-ion-conductive ceramic material satisfies the aforementioned (a); i.e., when the contained Li, La, Zr, and Mg satisfy the mole ratio conditions: (1) and (2), excellent ion conductivity can be attained. Although the mechanism therefor has not clearly been elucidated, a conceivable reason is as follows. In the case where LLZ contains Mg, the ionic radius of Li is almost equivalent to that of Mg, and Mg is readily placed in Li sites where Li is originally present in the LLZ crystal phases. When Mg replaces Li, some Li sites become pores in the crystal structure, due to the difference in amount of electric charge between Li and Mg, thereby conceivably enhancing the mobility of Li ions. As a result, ion conductivity may be enhanced. In the lithium-ion-conductive ceramic material, when the mole ratio of Li to the sum of La and element A is smaller than 1.33 or greater than 3, a metal oxide other than a lithium-ion-conductive ceramic material having a garnet-type or garnet-like crystal structure is readily formed. As the metal oxide content increases, the amount of the lithium-ion-conductive ceramic material having a garnet-type or garnet-like crystal structure relatively decreases. Also, since the metal oxide has low ion conductivity, the ion conductivity of the product decreases. As the Mg content of the lithium-ion-conductive ceramic material increases, Mg is readily placed in Li sites, and some Li sites become pores, to thereby enhance the lithium ion conductivity. When the mole ratio of Mg to the sum of La and element A is in excess of 0.5, an Mg-including metal oxide is readily formed. As the Mg-including metal oxide content increases, the amount of the lithium-ion-conductive ceramic material having a garnet-type or garnet-like crystal structure relatively decreases. The Mg-including metal oxide has low ion conductivity. Thus, when the mole ratio of Mg to the sum of La and element A is in excess of 0.5, the ion conductivity of the lithium-ion-conductive ceramic material decreases.

When the lithium-ion-conductive ceramic material satisfies (b) above; i.e., when the lithium-ion-conductive ceramic material contains Li, La, Zr, and A so as to satisfy the mole ratio conditions (1) and (3), excellent ion conductivity can be attained. Although the mechanism therefor has not clearly been elucidated, a conceivable reason is as follows. In the case where LLZ contains element A, the ionic radius of La is almost equivalent to that of element A, and element A is readily placed in La sites where La is originally present in the LLZ crystal phases. When element A replaces La, the crystal lattice deforms, and free Li ions increase due to the difference in amount of electric charge between La and element A, thereby conceivably enhancing ion conductivity. In the lithium-ion-conductive ceramic material, when the mole ratio of Li to the sum of La and element A is smaller than 1.33 or greater than 3, a metal oxide other than a lithium-ion-conductive ceramic material having a garnet-type or garnet-like crystal structure is readily formed. As the metal oxide content increases, the amount of the lithium-ion-conductive ceramic material having a garnet-type or garnet-like crystal structure relatively decreases. Also, since the metal oxide has low ion conductivity, the ion conductivity of the product decreases. As the element A content of the lithium-ion-conductive ceramic material increases, element A is readily placed in La sites. As a result, the lattice deformation increases, and free Li ions increase due to the difference in amount of electric charge between La and element A, thereby enhancing ion conductivity. When the mole ratio of element A to the sum of La and element A is in excess of 0.67, an element A-including metal oxide is readily formed. As the element A-including metal oxide content increases, the amount of the lithium-ion-conductive ceramic material having a garnet-type or garnet-like crystal structure relatively decreases. Also, since the element A-including metal oxide has low ion conductivity, the ion conductivity of the product decreases.

The aforementioned element A is at least one element selected from the group consisting of Ca, Sr, and Ba. Needless to say, Ca, Sr, and Ba are group 2 elements defined in the relevant periodic table, and readily form divalent cations. These elements have almost the same ionic radius. Since the ionic radius of each of Ca, Sr, and Ba is almost the same as that of La, La elements present in the La sites of LLZ are readily substituted with Ca, Sr, or Ba. Among Ca, Sr, and Ba, Sr is preferred, since the lithium-ion-conductive ceramic material containing Sr can be readily sintered, to provide a product having high ion conductivity.

When the lithium-ion-conductive ceramic material satisfies (c) above; i.e., when the lithium-ion-conductive ceramic material contains Li, La, Zr, Mg, and A so as to satisfy the mole ratio conditions (1) to (3), the conductive ceramic material can be readily sintered, to provide a product having higher ion conductivity. Also, when the lithium-ion-conductive ceramic material satisfy (d) above; i.e., when the lithium-ion-conductive ceramic material contains Li, La, Zr, Mg, and A so as to satisfy the mole ratio conditions (1') to (3'), the ion conductivity is further enhanced. Although the mechanism therefor has not clearly been elucidated, a conceivable reason is as follows. In LLZ, when Li in Li sites is substituted by Mg, and La in La sites is substituted by element A, some Li sites become pores, and free Li ions increases. As a result, ion conductivity may be further enhanced. More preferably, the lithium-ion-conductive ceramic material contains Li, La, Zr, Mg, and Sr, so as to satisfy the aforementioned conditions (1) to (3), particularly (1') to (3'). In this case, the produced lithium-ion-conductive ceramic material has high ion conductivity and high relative density.

In the case where the lithium-ion-conductive ceramic material of the present invention has high relative density as well as high ion conductivity, when the below-mentioned solid electrolyte layer 11 is formed from the ceramic material, a function of the solid electrolyte layer 11 (i.e., a function of preventing contact between a cathode layer 12 and an anode layer 13) is satisfactorily attained, even when the solid electrolyte layer 11 assumes a thin sheet. In addition, the electric resistance of the solid electrolyte layer 11 can be lowered by reducing the thickness thereof, whereby the internal resistance of a complete-solid battery 10 can be reduced.

When the below-mentioned protective layers 216, 217 are formed from the lithium-ion-conductive ceramic material of the present invention, functions of the protective layers 216, 217 (i.e., functions of preventing contact between a cathode layer 212 and/or an anode layer 213 and a solid electrolyte layer 211) are satisfactorily attained, even when the protective layers 216, 217 assume a thin sheet. In addition, the electric resistance of each of the protective layers 216, 217 can be lowered by reducing the thickness thereof, whereby the internal resistance of a complete-solid battery 210 can be reduced.

Furthermore, when the lithium-ion-conductive ceramic material of the present invention is incorporated into the cathode layers 12, 212 and/or the anode layers 13, 213, the internal resistance values of the cathode layers 12, 212 and/or the anode layers 13, 213 can be reduced by virtue of high ion conductivity. As a result, the internal resistance of a complete-solid battery 10 or 210 can be reduced.

In any of the aforementioned conditions (a) to (d), the lithium-ion-conductive ceramic material preferably contains Zr so as to satisfy the following mole ratio conditions (4). When Zr is contained under the conditions (4), a lithium-ion-conductive ceramic material having a garnet-type or garnet-like crystal structure can be readily produced.

$$0.33 \leq Zr/(La+A) \leq 1 \tag{4}$$

The species and amount of any element contained in the lithium-ion-conductive ceramic material may be determined through ICP (inductively coupled plasma) atomic emission spectroscopy. More specifically, in the case of a sintered body of the lithium-ion-conductive ceramic material, the body is crushed, and the thus-obtained powder is dissolved in a solvent such as an acid. The resultant solution is subjected to a compositional analysis by means of an ICP atomic emission spectrometer.

Through ICP (inductively coupled plasma) atomic emission spectroscopy of the lithium-ion-conductive ceramic material, the presence of Li, La, and Zr, and at least one of Mg and A are confirmed. The thus-confirmed elements are essentially confirmed to satisfy the mole ratio conditions (1) to (3), preferably (1') to (3'), and the ceramic material has a garnet-type or garnet-like crystal structure as determined through an XRD analysis. No particular limitation is imposed on the form of Mg or A present in the lithium-ion-conductive ceramic material of the present invention, and examples of the form of the present Mg include placement in the Li sites of the garnet-type or garnet-like crystal structure crystal phase, and presence as a separate phase which is incorporated into the crystal structure and/or which is present at the crystal boundary or the like. From the viewpoint of enhancing ion conductivity, Mg is preferably present in Li sites of the crystal phase of a garnet-type or garnet-like crystal structure. Examples of the form of the presence element A include placement in the La sites of the garnet-type or garnet-like crystal structure crystal phase, and presence as a separate phase which is incorporated into the crystal structure and/or which is present at the crystal boundary or the like. From the viewpoint of enhancing ion conductivity, element A is preferably present in La sites of the crystal phase of a garnet-type or garnet-like crystal structure.

The lithium-ion-conductive ceramic material of the invention contains Li, La, and Zr, as well as at least one of Mg and A. So long as the lithium-ion-conductive ceramic material has a target ion conductivity, the lithium-ion-conductive ceramic material may further contain an additional element other than the aforementioned elements. Meanwhile, during a production step of a lithium-ion-conductive ceramic sintered body, Li and other elements may vaporize during firing, or the aforementioned elements may enter the crystal structure. Therefore, the lithium-ion-conductive ceramic material does not always exhibit an ideal composition. For example, the composition may be deviated from a composition corresponding to the garnet-type or garnet-like crystal structure and an oxide represented by formula (II): $B_7C_3D_2O_{12}$ (wherein B represents Li and/or an Li-substitutable metal element; C represents La and/or an La-substitutable metal element; and D represents Zr and/or a Zr-substitutable metal element).

The lithium ion-conductive ceramic material does not necessarily contain Al. The expression "containing no Al" refers to the state that the percent presence of Al in the lithium ion-conductive ceramic material is less than 0.01 wt. %, as determined through ICP (inductively coupled plasma) atomic emission spectroscopy. More specifically, in the case of a sintered body of the lithium-ion-conductive ceramic material, the body is crushed, and the thus-obtained powder is dissolved in a solvent such as an acid. The resultant solution is subjected to a compositional analysis by means of an ICP atomic emission spectrometer.

Whether or not the lithium-ion-conductive ceramic material has a garnet-type or garnet-like crystal structure may be determined through an analysis of the lithium-ion-conductive ceramic material by means of an X-ray diffractometer (XRD). More specifically, the relevant lithium-ion-conductive ceramic material is crushed, and the thus-obtained powder is analyzed by means of an X-ray diffractometer, to thereby obtain an X-ray diffraction pattern. Through comparison of the thus-obtained X-ray diffraction pattern with a corresponding chart disclosed in the corresponding ICDD (International Center for Diffraction Data) card, the substance contained in the lithium-ion-conductive ceramic material is identified. Notably, comparison of an X-ray diffraction pattern is conducted with reference to an ICDD card (01-080-4947) ($Li_7La_3Zr_2O_{12}$), corresponding to LLZ (cubic). Since the lithium-ion-conductive ceramic material of the present invention has a composition differing from that of the ICDD card (01-080-4947) ($Li_7La_3Zr_2O_{12}$), diffraction angles and relative diffraction intensities of diffraction peaks may vary.

Notably, from the viewpoint of attaining high ion conductivity, the lithium-ion-conductive ceramic material preferably exhibits only an XRD peak attributed to a metal oxide having a garnet-type or garnet-like crystal structure, and is substantially formed only of a metal oxide having a garnet-type or garnet-like crystal structure. So long as a target ion conductivity can be attained, the lithium-ion-conductive ceramic material may not be formed only of a metal oxide having a garnet-type or garnet-like crystal structure. Alternatively, the ceramic material may exhibit an XRD peak attributed to a species other than a metal oxide having a garnet-type or garnet-like crystal structure. In the case where some XRD peaks attributed to a species other than a metal oxide having a garnet-type or garnet-like crystal structure are detected (i.e., first, second, and third peaks having intensities in this order), these three peak intensities are preferably greater than those attributed to other metal oxides, from the viewpoint of attaining a target ion conductivity.

The lithium-ion-conductive ceramic material may be in the form of powder or a sintered body (a bulk body) having predetermined dimensions. No particular limitation is imposed on the form of the ceramic sintered body, and examples include pellet, thin sheet, and thin film. In the case where the lithium-ion-conductive ceramic material is employed as the below-described solid electrolyte layer 11, particularly in the case where the sintered body is a conventional thin sheet, and is used as a solid electrolyte contained in the cathode layer 12 and the anode layer 13, the cathode layer 12 and the anode layer 13 are generally produced by mixing a powder-form material of the lithium-ion-conductive ceramic material with electrode materials such as a cathode active substance and an anode active substance.

In the case where the lithium-ion-conductive ceramic material is used as the solid electrolyte layer 11 and in the form of a sintered body, the density thereof is preferably high. More specifically, the relative density of the lithium-ion-conductive ceramic material is preferably 86% or higher, with respect to the theoretical density. When the lithium-ion-conductive ceramic material has a relative density of 86% or higher, the solid electrolyte layer 11 having a small thickness can be formed from the lithium-ion-conductive ceramic material, while the functions of solid electrolyte layer 11 can be satisfied. Thus, the internal resistance of the complete-solid battery 10 can be reduced.

The relative density may be determined through the following procedure. Firstly, the mass of a target sintered body in a dry state is measured by means of, for example, an electronic balance, and the volume of the sintered body is determined by means of vernier calipers. The thus-measured dry mass is divided by the volume, to thereby calculate the density of the sintered body. Separately, the theoretical density of the sintered body is calculated. Then, the relative density (%) may be derived by dividing the determined density (×100) by the theoretical density.

The lithium-ion-conductive ceramic material preferably has an ion conductivity, at room temperature, of $1 \times 10^{-5}$ S/cm or higher. When the ion conductivity of the lithium-ion-conductive ceramic material falls within the above range, the provided complete-solid battery 10 can exhibit target performance.

The ion conductivity may be determined in the following manner. Firstly, each main surface of a sintered body (i.e., a bulk body) is polished, and the polished surface is coated with gold. Then, the specific resistance of the sintered body (i.e., a bulk body) is measured at room temperature through the AC impedance method. The ion conductivity is the reciprocal of the specific resistance.

The lithium-ion-conductive ceramic material according to the present invention can be produced at reduced cost and exhibits high ion conductivity. Thus, the material can be suitably used as a material of various members of a lithium battery. Examples of the material of lithium battery members include materials of a cathode layer, an anode layer, a solid electrolyte layer, and a protective layer disposed between the solid electrolyte layer and the cathode layer or the anode layer.

(Lithium-Ion-Conductive Ceramic Sintered Body)

Next, an embodiment of the lithium-ion-conductive ceramic sintered body according to the present invention will be described. The lithium-ion-conductive ceramic sintered body has a first crystal phase containing Li and having a garnet-type or garnet-like crystal structure and a second crystal phase containing Li, Mg, Zr, and O. The lithium-ion-conductive ceramic sintered body exhibits higher ion conductivity, as compared with a ceramic sintered body formed from a similar ceramic material including the first crystal phase but no second crystal phase.

Figure 5:
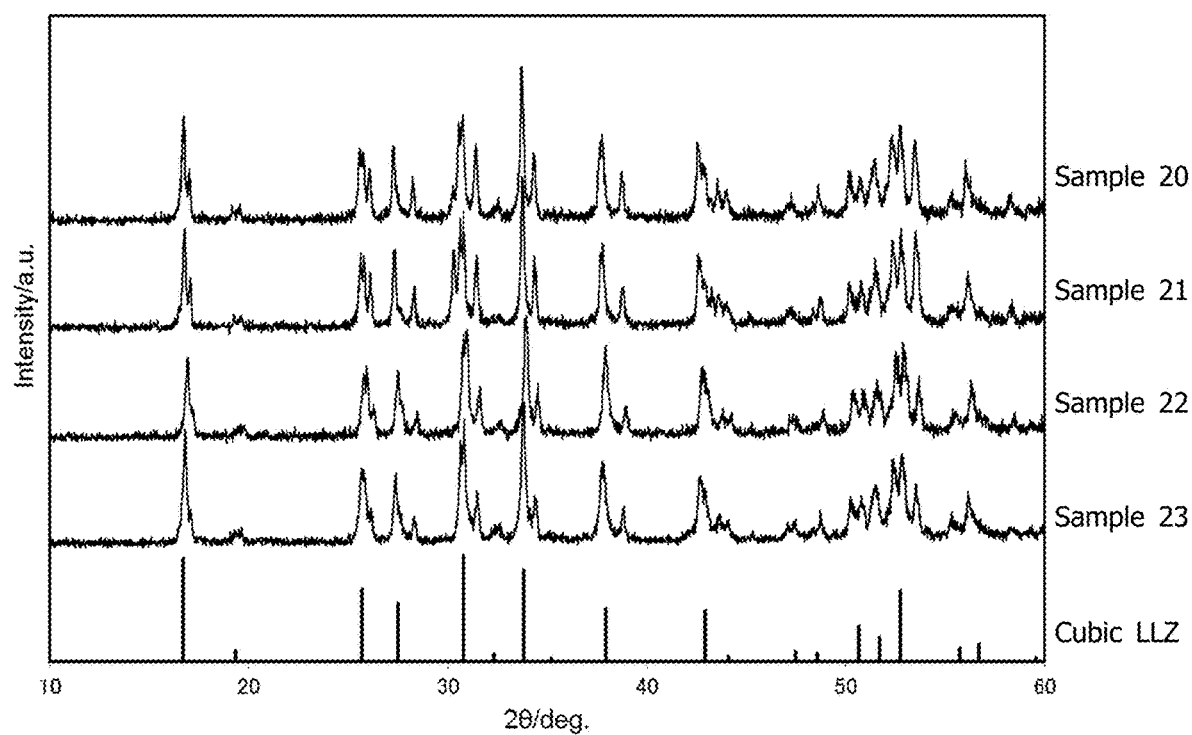
FIG. 5 shows X-ray diffraction patterns of samples 20 to 23, obtained through XRD analysis.

The reason why the lithium-ion-conductive ceramic sintered body of the present invention exhibits higher ion conductivity, as compared with a ceramic sintered body formed from a similar ceramic material including the first crystal phase but no second crystal phase, has not been clearly elucidated. However, the present inventors may provide the following conceivable mechanism. Specifically, during firing to form the lithium-ion-conductive ceramic sintered body, Li contained in the second crystal phase preferentially become volatile, whereby the Li content of the first crystal phase, which is a phase having high ion conductivity, can be controlled to a constant level. Thus, consistent ion conductivity may be attained. Also, as shown in FIG. 5(*d*), a part of the second crystal phase is present in pores of the first crystal phase. Since a large space of the pores is filled with the second crystal phase, Li ion mobility is enhanced, resulting in enhanced ion conductivity. Therefore, the lithium-ion-conductive ceramic sintered body in which the first crystal phase and the second crystal phase are generated exhibits high ion conductivity.

The first crystal phase is formed of a metal oxide which essentially contains Li and has a garnet-type or garnet-like crystal structure. One example of the first crystal phase is a crystalline oxide which contains Li, La, Zr, and O, which has a garnet-type or garnet-like crystal structure, and which is represented by formula (I): $Li_7La_3Zr_2O_{12}$ (hereinafter may be referred to also as LLZ). The crystalline oxide includes sites where Li is placed (called Li sites), sites where La is placed (called La sites), and sites where Zr is placed (called Zr sites).

In the crystalline compound represented by formula (I), Li atoms are essentially placed in the Li sites, and a part of the Li atoms are preferably substituted with Mg. No particular limitation is imposed on the percent substitution with element Mg, but 0 to 0.273 Li atoms are preferably substituted with Mg, wherein the number of all atoms in the Li sites (the total number of the number of Li atoms and that of Mg atoms) is defined as 1. Since the ionic radius of Li is almost equivalent to that of Mg, Mg is thought to be readily substituted with Li in the Li sites. When the first crystal phase contains Li, La, Zr, and Mg and has a garnet-type or garnet-like crystal structure, the provided lithium-ion-conductive ceramic sintered body exhibits higher ion conductivity. Notably, Mg is preferably placed in Li sites from the viewpoint of attaining enhanced ion conductivity. However, no particular limitation is imposed on the mode of presence of Mg, and Mg may be present in the crystal structure as an interstitial mode, and/or as a separate phase at a crystal grain boundary or the like.

In the crystalline compound represented by formula (I), preferably, La atoms are essentially placed in the La sites, and a part of the La atoms are substituted with element A (wherein element A is at least one element selected from the group consisting of Ca, Sr, and Ba). No particular limitation is imposed on the percent substitution with element A, but 0 to 0.667 La atoms are preferably substituted with element A atoms, wherein the number of all atoms in the La sites (the total number of the number of La atoms and that of element A atoms) is defined as 1. Ca, Sr, and Ba are group 2 elements defined in the relevant periodic table, and readily form divalent cations. These elements have almost the same ionic radius. Since the ionic radius of each of Ca, Sr, and Ba is almost the same as that of La, La elements present in the La sites are thought to be readily substituted with Ca, Sr, or Ba. Among Ca, Sr, and Ba, partial substitution of La with Sr is preferred, from the viewpoint of attaining high ion conductivity. When the first crystal phase contains Li, La, Zr, and element A (particularly Li, La, Zr, Mg, and element A) and has a garnet-type or garnet-like crystal structure, the provided lithium-ion-conductive ceramic sintered body exhibits higher ion conductivity. Notably, element A is preferably placed in La sites from the viewpoint of attaining enhanced ion conductivity. However, no particular limitation is imposed on the mode of presence of element A, and element A may be present in the crystal structure as an interstitial mode, and/or as a separate phase at a crystal grain boundary or the like. Alternatively, a part of La atoms may also be substituted with elements other than element A, for example, at least one element selected from among K, Y, Pr, Nd, Sm, Gd, and Lu.

In the crystalline compound represented by formula (I), Zr atoms are essentially placed in the Zr sites, and a part of the Zr atoms may be substituted with element B (wherein element B is at least one element selected from the group consisting of Sc, Ti, V, Ga, Y, Nb, In, Sn, Hf, Ta, W, Pb, Bi, Si, Ge, Sb, and Te).

The second crystal phase is a crystalline metal oxide containing at least Li, Mg, Zr, and O. Preferably, the second crystal phase is formed such that the second crystal phase is dispersed in the first crystal phase serving as a main crystal phase and fills the pores present in the first crystal phase. Through formation of the second crystal phase so as to fill the pores in the first crystal phase, a provided lithium-ion-conductive ceramic sintered body exhibits higher ion conductivity. Also, since the lithium-ion-conductive ceramic sintered body has an Li-containing second crystal phase, Li atoms contained in the second crystal phase preferentially become volatile during firing, and the Li content of the highly ion conductive first crystal phase is maintained at a constant level, whereby a consistent ion conductivity can be attained.

Whether or not the lithium-ion-conductive ceramic sintered body includes a first crystal phase having a garnet-type or garnet-like crystal structure may be determined through an analysis of a powder obtained by crushing the lithium-ion-conductive ceramic sintered body, by means of an X-ray diffractometer (XRD). Specifically, the relevant lithium-ion-conductive ceramic sintered body is crushed, and the thus-obtained powder is analyzed by means of an X-ray diffractometer (XRD), to thereby obtain an X-ray diffraction pattern. Through comparison of the thus-obtained X-ray diffraction pattern with a corresponding chart disclosed in the corresponding ICDD (International Center for Diffraction Data) card, the substance contained in the lithium-ion-conductive ceramic sintered body is identified. For example, in the case where the first crystal phase is assumed to be a crystalline compound represented by formula (I), comparison of an X-ray diffraction pattern is conducted with reference to an ICDD card (01-080-4947) ($Li_7La_3Zr_2O_{12}$), corresponding to LLZ. In a certain case, the first crystal phase of LLZ may be partially substituted by another element, and the diffraction angle and relative diffraction peak intensities of diffraction peaks may slightly vary from those shown in the ICDD card corresponding to LLZ. However, if the observed X-ray diffraction pattern and relative diffraction intensities generally coincide with those shown in the ICDD card corresponding to LLZ, the first crystal phase can be determined to have a garnet-like crystal structure.

The elements contained in the first crystal phase and second crystal phase may be identified through the following procedure. Firstly, a lithium-ion-conductive ceramic sintered body is cut to expose a cut surface, and the cut surface is polished to provide a polished surface. The main crystal phase having the largest area observed in the cut surface is employed as the first crystal phase. The main crystal phase is subjected to an element analysis by means of an energy dispersive X-ray spectrometer (EDS) attached to a scanning electron microscope (SEM) or a transmission electron microscope (TEM), whereby the species of elements contained in the first crystal phase are determined. Regarding the second crystal phase, particles dispersed in the main crystal phase are defined to form the second crystal phase. Through element analysis of the particles by means of an EDS, the species of elements contained in the second crystal phase are determined. Meanwhile, Li cannot be detected through SEM-EDS or TEM-EDS. In the case of Li, n the polished surface is subjected to an Li mapping analysis through time-of-flight secondary ion mass spectrometry (TOF-SIMS), to thereby confirm whether or not the first crystal phase or the second crystal phase contains Li. Also, the crystalline nature of the second crystal phase can be confirmed with reference to an SEM or TEM electron-beam diffraction pattern of the particles which have been subjected to element analysis through EDS.

The lithium-ion-conductive ceramic sintered body preferably includes the second crystal phase at 0.5 area % to 10 area %, as determined in a cross-section of the sintered body, more preferably at 0.5 area % to 5 area %, still more preferably at 0.5 area % to 3 area %. When the second crystal phase content falls within the above ranges, volatilization of Li in the first crystal phase is prevented by volatilization of Li atoms preferentially from the second crystal phase during firing. In addition, since the pores in the first crystal phase are filled with the second crystal phase, the provided lithium-ion-conductive ceramic sintered body exhibits higher ion conductivity. When the area ratio of the second crystal phase is excessively small, difficulty is encountered in attaining the effect of enhancing ion conductivity, whereas when the area ratio of the second crystal phase is excessively large, the relative amount of the highly ion-conductive first crystal phase decreases, and ion conductivity may decrease.

The area ratio of the second crystal phase of the lithium-ion-conductive ceramic sintered body may be determined through the following procedure. Firstly, a polished surface is provided in a manner similar to that employed in the aforementioned EDS analysis. A plurality of arbitrarily chosen sites of the polished surface are observed under an SEM. Images are taken at such a magnification that a plurality of second crystal phase grains can be identified (e.g., ×1,000). Straight lines are drawn such that the lines thoroughly surround the contour of each of the second crystal phase particles identified by the SEM image, and minimize the area of the particle in the SEM image. The area defined by the straight lines is employed as an area of a second crystal phase particle, and the total area of the second crystal phase particles in the SEM image is determined. Next, the total area of the SEM image is determined. Then, the ratio of the total area of the second crystal phase to the total area of the image is calculated.

The lithium-ion-conductive ceramic sintered body preferably has high density. More specifically, the relative density of the lithium-ion-conductive ceramic sintered body is preferably 80% or higher, with respect to the theoretical density, more preferably 90% or higher. When the lithium-ion-conductive ceramic sintered body has a relative density of 80% or higher, particularly 90% or higher, a solid electrolyte layer having a small thickness can be formed from the lithium-ion-conductive ceramic sintered body. In this case, the functions of the solid electrolyte layer can be satisfied, since short circuit between the cathode layer and the anode layer therein is prevented. As a result, the internal resistance of the lithium battery produced therefrom can be reduced.

The relative density may be determined through the following procedure. Firstly, the mass of a target lithium-ion-conductive ceramic sintered body in a dry state is measured by means of, for example, an electronic balance, and the volume of the sintered body is determined by means of vernier calipers. The thus-measured dry mass is divided by the volume, to thereby calculate the density of the sintered body. Separately, the theoretical density of the sintered body is calculated. Then, the relative density (%) may be derived by dividing the determined density (×100) by the theoretical density.

The lithium-ion-conductive ceramic sintered body preferably has an ion conductivity, at room temperature, of $1 \times 10^{-4}$ S/cm or higher, more preferably $1 \times 10^{-3}$ S/cm or higher. When the ion conductivity of the lithium-ion-conductive ceramic sintered body is $1 \times 10^{-4}$ S/cm or higher, particularly $1 \times 10^{-3}$ S/cm or higher, the lithium battery having a solid electrolyte layer formed of the lithium-ion-conductive ceramic sintered body can exhibit reduced internal resistance, and high capacity and output.

The ion conductivity may be determined in the following manner. Firstly, each main surface of a sintered body is polished, and the polished surface is coated with gold. Then, the specific resistance of the lithium-ion-conductive ceramic sintered body is measured at room temperature through the AC impedance method. The ion conductivity is the reciprocal of the specific resistance.

No particular limitation is imposed on the form of the lithium-ion-conductive ceramic sintered body, and the sintered body may be in the form of a bulk body having predetermined dimensions, granule, powder, or the like. In the case where the lithium-ion-conductive ceramic sintered body is a bulk body, no particular limitation is imposed on the form of the bulk body, and examples thereof include pellet, thin sheet, and thin film. In the case where the lithium-ion-conductive ceramic sintered body is employed as the below-described solid electrolyte layer 11 or protective layer 216 or 217, the sintered body is generally in the form of thin sheet. In the case where the sintered body is used as a solid electrolyte contained in the cathode layer 12 and the anode layer 13, the cathode layer 12 and the anode layer 13 are generally produced by mixing a powder-form material of the lithium-ion-conductive ceramic sintered body and an electrode material such as a cathode active substance or an anode active substance.

The lithium-ion-conductive ceramic sintered body of the present invention, which exhibits high ion conductivity, can be suitably employed as a material of various members of a lithium battery. Examples of the material of lithium battery members include materials of a cathode layer, an anode layer, a solid electrolyte layer, and a protective layer disposed between the solid electrolyte layer and the cathode layer and/or between the solid electrolyte layer and the anode layer.

Next will be described an embodiment of the method of producing the lithium-ion-conductive ceramic material of the present invention. In the below-described case, the lithium-ion-conductive ceramic material of the present invention is formed into a sintered body. In addition, a case where the lithium-ion-conductive ceramic sintered body is produced as a bulk body will also be described. The lithium-ion-conductive ceramic material (sintered body) production method includes a mixing step of mixing raw materials, to thereby provide a material mixture, and a firing step of firing the obtained material mixture.

In the mixing step, materials which contain Li, La, and Zr, and at least one of Mg and A (wherein A represents at least one element selected from the group consisting of Ca, Sr, and Ba) are mixed, to thereby prepare a material mixture. These components are mixed at such proportions that the produced lithium-ion-conductive ceramic material has a garnet-type or garnet-like crystal structure. In the mixing step of this embodiment, these components are mixed at such proportions that the sintered product obtained from the material satisfies the following mole ratio conditions: (1) to (4), preferably (1') to (4'). Among the above elements, particularly, Li is readily vaporized during firing. Thus, the amount of Li incorporated into the material mixture is adjusted to exceed the targeted Li proportion of the lithium-ion-conductive ceramic material after firing. Through firing the thus-prepared material mixture in the below-mentioned manner, there can be provided a lithium-ion-conductive ceramic material having a garnet-type or garnet-like crystal structure which includes a crystal phase represented by formula (I) partially substituted with Mg and/or element A.

$$1.33 \leq Li/(La+A) \leq 3 \quad (1)$$

$$0 < Mg/(La+A) \leq 0.5 \quad (2)$$

$$0 < A/(La+A) \leq 0.67 \quad (3)$$

$$0.33 < Zr/(La+A) \leq 1 \quad (4)$$

$$2.0 \leq Li/(La+A) \leq 2.7 \quad (1')$$

$$0.01 \leq Mg/(La+A) \leq 0.14 \quad (2')$$

$$0.04 \leq A/(La+A) \leq 0.17 \quad (3')$$

$$0.33 < Zr/(La+A) \leq 1 \quad (4')$$

Alternatively, in the mixing step, a material mixture may be prepared by mixing materials which contain, for example, Li, Mg, and $M_L$ (wherein element $M_L$ represents La or La and at least one species selected from the group consisting of K, Ca, Sr, Y, Ba, Pr, Nd, Sm, Gd, and Lu) and element $M_z$ (wherein element $M_z$ represents Zr or Zr and at least one element selected from the group consisting of Sc, Ti, V, Ga, Y, Nb, In, Sn, Hf, Ta, W, Pb, Bi, Si, Ge, Sb, and Te), wherein the proportions of the elements Li, Mg, and Zr are adjusted to exceed the theoretical proportions of the corresponding crystalline oxide having a garnet-type crystal structure. The theoretical compositional proportions are those of the corresponding crystalline oxide having a garnet-type crystal structure to be yielded as a sintered body. An example of the theoretical compositional proportions of the crystalline oxide having a garnet-type crystal structure is basically LLZ represented by formula (I), wherein at least Li among Li, La, and Zr is partially substituted with Mg, and La or Zr is optionally substituted with another element. Such a composition may be represented by formula (II): $Li_{7-2\alpha}Mg_\alpha M_{L3}M_{Z2}O_{12}$ ($0 \leq \alpha \leq 1.5$). In the composition represented by formula (II), La is preferably substituted with another element at a specific substitution ratio, from the viewpoints of facilitating formation of a crystalline oxide having a garnet-type crystal structure and attaining high ion conductivity. Alternatively, Zr may be substituted with another element at a specific substitution ratio. In other words, the composition is preferably represented by formula (III): $Li_\delta Mg_\alpha La_{3-\beta} A2_\beta Zr_{2-\gamma} B_\gamma O_{12}$ ($0 \leq \alpha \leq 1.5$, $0 < \beta \leq 2$, $0 < \gamma \leq 1$, and $5.5 \leq \delta \leq 9$), wherein element A2 represents an $M_L$ element other than La, and element B represents an $M_Z$ element other than Zr. Preferably, with respect to 1 mol of the composition represented by formula (II) or (III), Li is incorporated at an excess of 0 to 15 mol %, Mg is incorporated at an excess of 1 to 20 mol %, and Zr is incorporated at an excess of 1 to 20 mol %. Regarding Mg and Zr, more preferably, Mg is incorporated at an excess of 1 to 10 mol %, and Zr is incorporated at an excess of 1 to 10 mol %. Firing a material mixture containing Li, Mg, and Zr in excessive amounts falling within the aforementioned range can facilitate formation of a lithium-ion-conductive ceramic sintered body including a first crystal phase (a main crystal phase) which contains Li and which has a garnet-type or garnet-like crystal structure, and a second crystal phase which contains Li, Mg, Zr, and O in appropriate amounts. As a result, high ion conductivity can be attained.

No particular limitation is imposed on the raw material containing the aforementioned components, so long as the material can be converted to the corresponding components via firing. Examples of the raw material include an oxide, a complex oxide, a hydroxide, a carbonate, a chloride, a sulfate, a nitrate, and a phosphate, which contain Li, La, Zr, Mg, and A components. Specific examples the powder-form material containing any of the aforementioned components include $Li_2O$, $LiOH$, $Li_2CO_3$, $La_2O_3$, $La(OH)_3$, $ZrO_2$, $MgO$, $MgCO_3$, $CaO$, $CaCO_3$, $SrO$, $SrCO_3$, $BaO$, and $BaCO_3$. The material containing any of the aforementioned components may or may not contain an oxygen (O) component. In the case where the material containing any of the aforementioned components contains no oxygen (O) component, there is produced a lithium-ion-conductive ceramic material containing Li, La, Zr, and O, as well as Mg and/or A, through performing the below-described firing step in an appropriate firing atmosphere such as an oxidizing atmosphere. In this case, a lithium-ion-conductive ceramic sintered body having a first crystal phase and a second crystal phase can be produced.

The material mixture may be prepared appropriately through a known method for preparing raw powder material which method is employed in synthesis of ceramics. In one specific procedure, materials containing the aforementioned components are put into a pot made of Nylon with zirconia balls, and the mixture is pulverized by means of a ball mill with an organic solvent for 8 to 20 hours. The product is dried, to thereby yield a material mixture. Examples of the organic solvent include alcohols such as ethanol and butanol, and acetone.

Before the firing step, a step of calcining the material mixture is preferably performed. In one mode of the calcining step, the material mixture is placed on an MgO plate and calcined at 900 to 1,100° C. for 2 to 15 hours, to thereby yield a calcined material. Through the calcining step, a ceramic material having a garnet-type or garnet-like crystal structure can be readily produced by the sintering step.

Before the firing step, a step of adding a binder to the calcined material and subjecting the mixture to pulverization is preferably performed. In one mode of the step, a binder is added to the calcined material, and the mixture is pulverized in an organic solvent for 8 to 100 hours by means of a ball mill. The product is dried, to thereby yield an unfired material. Through further pulverizing the calcined material, a uniform crystal phase can be readily obtained by the sintering step. Examples of the binder include methylcellulose, ethylcellulose, polyvinyl alcohol, and polyvinyl butyral. Examples of the organic solvent include ethanol, butanol, and acetone.

In the firing step, the material mixture obtained through the mixing step is fired. In a specific procedure, the material mixture is put into a metal mold having a shape and dimensions of interest and press-molded. For example, the mixture is pressed at an isostatic pressure of 1 to 2 t/cm² by means of a cold isostatic pressing (CIP) machine, to thereby form a compact. The compact is fired at 1,000 to 1,250° C. for 3 to 36 hours, to thereby yield a sintered body of the lithium-ion-conductive ceramic material.

When the material mixture contains no oxygen component, the compact is preferably fired in an oxygen-containing atmosphere. When the material mixture contains an oxygen component, the compact may be fired in an inert gas atmosphere (e.g., under nitrogen) or a reducing atmosphere. Notably, in the case where the calcining step is performed after the mixing step, the calcined material is subjected to the firing step. Also, in the case where the binder-addition and pulverization step is performed after the mixing step, the unfired material is subjected to the firing step.

According to the lithium-ion-conductive ceramic material production method, the lithium-ion-conductive ceramic sintered body of the present invention can be easily produced. Also, according to the lithium-ion-conductive ceramic sintered body production method, a lithium-ion-conductive ceramic sintered body having a first crystal phase and a second crystal phase can be easily produced. The lithium-ion-conductive ceramic sintered body as is may be used as a solid electrolyte layer or a protective layer of the below-mentioned lithium battery. Alternatively, the lithium-ion-conductive ceramic sintered body may be appropriately worked, to thereby serve as a solid electrolyte layer or a protective layer of the below-mentioned lithium battery.

In the case where the lithium-ion-conductive ceramic material of the present invention is employed as a solid electrolyte contained in the cathode layer and the anode layer, the material mixture is not subjected to press-forming in the firing step, and, instead, the mixture in the powder form is fired, to thereby yield a lithium-ion-conductive ceramic material.

(Lithium Battery of First Embodiment)

A complete-solid battery, which is a first embodiment of the lithium battery according to the present invention, will next be described with reference to the drawings. FIG. 1 is a cross-section of a complete-solid battery, which schematically shows an embodiment of the lithium battery of the present invention.

A complete-solid battery 10 is a lithium ion battery in which all the constituting members are formed of a solid, and has a solid electrolyte layer 11, a cathode layer 12, an anode layer 13, a first collector member 14, and a second collector member 15. The lithium-ion-conductive ceramic material of the present invention is contained in at least one of the solid electrolyte layer 11, the cathode layer 12, and the anode layer 13.

No particular limitation is imposed on the material of the solid electrolyte layer 11, and a material exhibiting a lithium ion conductivity may be used. Examples of the material of forming the solid electrolyte layer 11 include the lithium-ion-conductive ceramic material of the present invention, a NASICON-type lithium aluminum titanium phosphate complex oxide (e.g., $Li(Al,Ti)_2(PO_4)_3$ (referred to as LATP)), a lithium aluminum germanium phosphate complex oxide (e.g., $Li(Al,Ge)_2(PO_4)_3$ (referred to as LAGP)), and a perovskite-type lithium lanthanum titanium complex oxide (e.g., $La_{2/3-x}Li_{3x}TiO_3$ (referred to as LLT)). Of these, the lithium-ion-conductive ceramic material of the present invention is a preferred material of the solid electrolyte layer 11. The lithium-ion-conductive ceramic material of the present invention is stable with respect to metallic lithium. Thus, in the case where the cathode layer 12 or the anode layer 13 contains a lithium component, when the solid electrolyte layer 11 is formed of the lithium-ion-conductive ceramic material of the present invention, redox-induced deterioration of the solid electrolyte layer 11 can be suppressed. Furthermore, the solid electrolyte layer 11 formed of the lithium-ion-conductive ceramic material of the present invention has high density. Thus, a solid electrolyte layer in the form of thin sheet can be produced, whereby the internal resistance of the complete-solid battery 10 can be reduced. In addition, the lithium-ion-conductive ceramic material of the present invention attains a target ion conductivity at reduced cost, whereby the high-performance complete-solid battery 10 can be produced at reduced cost. Also, the lithium-ion-conductive ceramic sintered body of the present invention is stable with respect to metallic lithium. Thus, in the case where the cathode layer 12 or the anode layer 13 contains a lithium component, when the solid electrolyte layer 11 is formed of the lithium-ion-conductive ceramic sintered body of the present invention, redox-induced deterioration of the solid electrolyte layer 11 can be suppressed. Furthermore, the lithium-ion-conductive ceramic sintered body of the present invention, which exhibits high ion conductivity, can provide the complete-solid battery 10 with high capacity and output.

The cathode layer 12 is disposed on one main surface of the solid electrolyte layer 11, and the anode layer 13 is disposed on the other main surface of the solid electrolyte layer 11 (hereinafter, each electrode may be referred to simply as "electrode").

The cathode layer 12 is formed from a cathode active material and a material containing a solid electrolyte. No particular limitation is imposed on the cathode active material, and examples thereof include sulfur, $TiS_2$, $LiCoO_2$, $LiMn_2O_4$, and $LiFePO_4$. No particular limitation is imposed on the solid electrolyte contained in the cathode layer 12, so long as the material exhibits lithium ion conductivity. Examples of the solid electrolyte include the lithium-ion-conductive ceramic material of the present invention and the like, which are the aforementioned materials of forming the solid electrolyte layer 11. Notably, in the case where the cathode active material has no electron conductivity, the cathode layer is formed from a conducting aid, in addition to the cathode active material and the solid electrolyte. No particular limitation is imposed on the material of the conducting aid, so long as the material exhibits electron conductivity. Examples of the conducting aid include conductive carbon, nickel (Ni), platinum (Pt), and silver (Ag).

The anode layer 13 is formed from an anode active material and a material containing a solid electrolyte. No particular limitation is imposed on the anode active material, and examples thereof include metallic Li, lithium-aluminum alloy (Li—Al alloy), $Li_4Ti_5O_{12}$, carbon, silicon (Si), and silicon monoxide (SiO). No particular limitation is imposed on the material of the solid electrolyte contained in the anode layer 13, so long as the material exhibits lithium ion conductivity. Examples of the solid electrolyte include the lithium-ion-conductive ceramic material of the present invention and the like, which are the aforementioned materials of forming the solid electrolyte layer 11. Notably, in the case where the anode active material has no electron conductivity, the anode layer is formed from a conducting aid, in addition to the anode active material and the solid electrolyte. No particular limitation is imposed on the material of the conducting aid, so long as the material exhibits electron conductivity. Examples of the conducting aid include conductive carbon, nickel (Ni), platinum (Pt), and silver (Ag).

In the cathode layer 12 and the anode layer 13, the lithium-ion-conductive ceramic material of the present invention may be used as a solid electrolyte. In this case, the lithium-ion-conductive ceramic material of the present invention attains a target ion conductivity at reduced cost, whereby the high-performance complete-solid battery 10 can be produced at reduced cost.

In at least one member of the cathode layer 12 and the anode layer 13, the lithium-ion-conductive ceramic sintered body of the present invention may be used as a solid electrolyte. In this case, the lithium-ion-conductive ceramic sintered body of the present invention attains a target ion conductivity at reduced cost, whereby the complete-solid battery 10 exhibiting high capacity and output can be produced at reduced cost.

The first collector member 14 is disposed on the surface of the cathode layer 12 opposite the surface on which the solid electrolyte layer 11 is disposed. The second collector member 15 is disposed on the surface of the anode layer 13 opposite the surface on which the solid electrolyte layer 11 is disposed. The first collector member 14 and the second collector member 15 are conductive members, which are formed of a conductive metallic material such as stainless steel (SUS), nickel (Ni), titanium (Ti), iron (Fe), copper (Cu), aluminum (Al), an alloy thereof, a carbon material, or the like.

The complete-solid battery 10 has the solid electrolyte layer 11, the cathode layer 12, and the anode layer 13, at least one of which is provided so as to contain the lithium-ion-conductive ceramic material of the present invention. The lithium-ion-conductive ceramic material of the present invention attains a target ion conductivity at reduced cost, whereby the produced high-performance complete-solid battery 10 exhibits high performance at reduced cost.

The complete-solid battery 10 has the solid electrolyte layer 11, the cathode layer 12, and the anode layer 13, at least one of which is provided so as to contain the lithium-ion-conductive ceramic sintered body of the present invention. The lithium-ion-conductive ceramic sintered body of the present invention exhibits high ion conductivity, whereby the complete-solid battery 10 exhibits high capacity and output.

Next, an embodiment of the method of producing the complete-solid battery 10 will be described.

The solid electrolyte layer 11 may be appropriately produced through a known ceramic compact production method. Also, in the case where the solid electrolyte layer 11 is formed of the lithium-ion-conductive ceramic material of the present invention, the layer may be produced by the same production method of the lithium-ion-conductive ceramic sintered body.

The cathode layer 12 and the anode layer 13 may be produced appropriately through a known method for producing a ceramic compact. In one specific procedure, the aforementioned cathode active material, a solid electrolyte, and an optional powder of a compound serving as a conducting aid are mixed at predetermined proportions, to thereby prepare a powder mixture. In the case where the lithium-ion-conductive ceramic material of the present invention is used as a solid electrolyte, a lithium-ion-conductive ceramic material is fired to form a powder by the aforementioned lithium-ion-conductive ceramic sintered body production method. Then, the powder is optionally subjected to pulverization or the like, to thereby adjust the particle size of the powder. The resultant powder is mixed with a cathode active material or the like, to thereby provide a powder mixture.

Subsequently, the powder mixture is placed in a cylindrical vessel for conducting press molding. Specifically, an SUS substrate material serving as the first collector member 14 and the powder mixture are sequentially stacked in the cylindrical vessel, and the stacked body is press-molded, to thereby form a cathode pellet. An anode pellet is formed through the same procedure.

Then, the cathode pellet, the solid electrolyte layer, and the anode pellet are stacked in this order such that the collector members 14, 15 of the cathode pellet and the anode pellet are placed as outermost layers, to thereby prepare a stacked body. Next, the stacked body is pressed at a specific pressure by the mediation of the first collector member 14 and the second collector member 15 in a sandwich manner, to thereby bond the component layers. As a result, the complete-solid battery 10 is fabricated.

Notably, the complete-solid battery 10 may be produced through a method other than the aforementioned procedure. Examples of such a production method include simultaneously firing the electrodes 12, 13 and the solid electrolyte layer 11; baking the electrodes 12, 13 to bond to the fired solid electrolyte layer 11 in the form of plate; and baking, under pressing, the electrodes 12, 13 to bond to the fired solid electrolyte layer 11 in the form of plate (i.e., a hot-press method).

(Lithium Battery of Second Embodiment)

Figure 2:
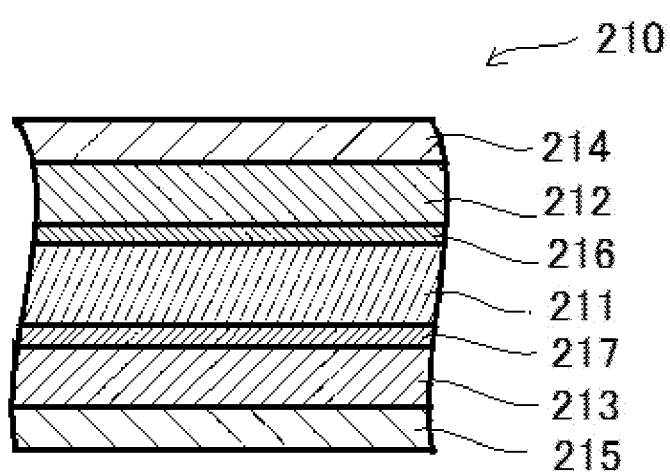
FIG. 2 is a cross-section of a complete-solid battery, which schematically shows another embodiment of the lithium battery of the present invention.

A complete-solid battery, which is a second embodiment of the lithium battery according to the present invention, will next be described with reference to the drawings. FIG. 2 is a cross-section of a complete-solid battery, which schematically shows an embodiment of the lithium battery of the present invention. Except for the following description, a complete-solid battery 210 of the second embodiment has the same configuration as that of the complete-solid battery 10 of the first embodiment.

The complete-solid battery 210 of the second embodiment has a first protective layer 216 disposed between a solid electrolyte layer 211 and a cathode layer 212, and a second protective layer 217 disposed between the solid electrolyte layer 211 and the anode layer 213 (hereinafter these protective layers may be referred to simply as a "protective layer"). That is, in the complete-solid battery 210, the first collector member 214, a cathode layer 212, the first protective layer 216, the solid electrolyte layer 211, the second protective layer 217, an anode layer 213, and a second collector member 215 are stacked in this order.

The solid electrolyte layer 211 may be formed from the same material of the solid electrolyte layer 11 of the first embodiment. Since the complete-solid battery 210 of the second embodiment has the protective layers 216, 217, the solid electrolyte layer 211 may be formed from a material which is more reactive to an electrode component, as compared with the lithium-ion-conductive ceramic material of the present invention. In other words, examples of the material of forming the solid electrolyte layer 211 include a NASICON-type lithium aluminum titanium phosphate complex oxide, a lithium aluminum germanium phosphate complex oxide, and a perovskite-type lithium lanthanum titanium complex oxide.

Each of the first protective layer 216 and the second protective layer 217 is formed of the lithium-ion-conductive ceramic material of the present invention. The lithium-ion-conductive ceramic material of the present invention is stable with respect to metallic lithium. In the case where the first protective layer 216 is disposed between the solid electrolyte layer 211 and the cathode layer 212, and the second protective layer 217 is disposed between the solid electrolyte layer 211 and the anode layer 213, when at least one of the cathode layer 212 and the anode layer 213 contains a lithium component, reaction between lithium and a material forming the solid electrolyte layer 211 is suppressed, whereby redox-induced deterioration of the solid electrolyte layer 211 can be suppressed. Also, the lithium-ion-conductive ceramic material of the present invention employs a relatively inexpensive element as a substitution element, whereby high ion conductivity can be attained at reduced cost. In the complete-solid battery 210, at least one of the protective layers 216, 217, the cathode layer 212, and the anode layer 213 is formed of the lithium-ion-conductive ceramic material of the present invention. Thus, the complete-solid battery 210 exhibits high performance at reduced cost.

In addition, the lithium-ion-conductive ceramic sintered body is difficult to react with the lithium component of the present invention and exhibits high ion conductivity. Thus, the complete-solid battery 210 exhibits high capacity and output.

The first protective layer 216 and the second protective layer 217 may be produced through the same method of producing the aforementioned lithium-ion-conductive ceramic sintered body production method. Specifically, the first collector member 214, the cathode layer 212, the first protective layer 216, the solid electrolyte layer 211, the second protective layer 217, the anode layer 213, and the second collector member 215 are sequentially stacked in this order, and the stacked body is pressed at a specific pressure in a sandwich manner, to thereby produce the complete-solid battery 210.

Notably, the complete-solid battery 210 may be produced through a method other than the aforementioned procedure. Examples of such a production method include stacking the cathode layer 212, the first protective layer 216, the solid electrolyte layer 211, the second protective layer 217, and the anode layer 213 in this order and an unfired state, and the firing the stacked body; baking the first protective layer 216 and the second protective layer 217 to bond to the fired solid electrolyte layer 211 in the form of plate, and then baking to bond the cathode layer 212 on the first protective layer 216 side, and the anode layer 213 on the second protective layer 217 side; and baking, under pressing, the protective layers 216, 217 to bond to the solid electrolyte layer 211 in the form of plate, and the electrodes 212, 213 to bond to the protective layers 216, 217 (i.e., a hot-press method).

The lithium battery of the present invention contains a lithium component in the cathode layer and/or the anode layer and includes a primary battery and a secondary battery. Thus, the embodiment of the lithium battery of the present invention is not limited to the aforementioned complete-solid batteries 10 and 210 as lithium ion batteries. Alternatively, the embodiment may include a lithium-air battery in which the anode active material is metallic lithium, and the cathode active material is oxygen. Notably, the lithium component in the cathode layer and/or the anode layer may be metallic lithium, a lithium alloy, or a lithium compound.

The lithium battery of the present invention is not limited to the aforementioned embodiments. Those skilled in the art can perform various modifications, so long as the objects of the present invention can be attained.

In the complete-solid battery 210 of the second embodiment, the first protective layer 216 and the second protective layer 217 are disposed on the respective surfaces of the solid electrolyte layer 211. However, it may be the case only one of the first protective layer 216 or the second protective layer 217 is provided. Also, in the complete-solid battery 210 of the second embodiment, the first protective layer 216 and the second protective layer 217 which are disposed on the respective surfaces of the solid electrolyte layer 211 are formed of the lithium-ion-conductive ceramic sintered body of the present invention. However, it may be the case only one of the first protective layer 216 and the second protective layer 217 is formed of the lithium-ion-conductive ceramic material of the present invention.

Also, no particular limitation is imposed on the forms of the complete-solid batteries 10 and 210 of the first and second embodiments. The forms of the battery include various forms such as coin, cylinder, square, box, and laminate.

EXAMPLES

[Production of Lithium-Ion-Conductive Ceramic Material]
(Sample 1)

Powder-form raw materials of $Li_2CO_3$, MgO, $La(OH)_3$, $SrCO_3$, and $ZrO_2$ were weighed and mixed, such that the proportions (by mole) of Li, Mg, La, Sr, and Zr components Li:Mg:La:Sr:Zr were adjusted to 7.75:0.25:2.75:0.25:2.0 (sample 1). The resultant mixture was put into a pot made of Nylon with zirconia balls, and the mixture was pulverized by means of a ball mill with ethanol for 15 hours. The product was dried, to thereby yield a material mixture.

The thus-obtained material mixture was placed on an MgO plate and calcined at 1,100° C. for 10 hours, to thereby yield a calcined material. A binder was added to the calcined material, and the mixture was subjected to pulverization by a ball mill in an organic solvent for 15 hours, and the product was further dried, to thereby produce an unfired material. The unfired material was put into a metal mold having a diameter of 12 mm, and press-molded so as to have a product thickness of about 1.5 mm. The molded product was pressed at an isostatic pressure of 1.5 t/cm² by means of a cold isostatic pressing (CIP) machine, to thereby form a compact. The compact was covered with a calcination powder having the same composition as that of the compact and fired at 1,200° C. in air for 4 hours, to thereby yield a sintered body of the lithium-ion-conductive ceramic material (sample 1).
(Sample 2)

Raw material powders were weighed in the same manner as employed in the case of sample 1, and a compact was formed in the same manner. Then, the compact was covered with a calcination powder having the same composition as that of the compact. Differing from the case of sample 1, the compact was fired at 1,200° C. in a reducing atmosphere for 4 hours, to thereby yield a sintered body of the lithium-ion-conductive ceramic material (sample 2).

(Sample 3)

Raw material powders were weighed in the same manner as employed in the case of sample 1, and a compact was formed in the same manner. Then, the compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 3).
(Sample 4)

Raw material powders were weighed in the same manner as employed in the case of sample 1, and a compact was formed in the same manner. Then, the compact was covered with a calcination powder having the same composition as that of the compact. Differing from the case of sample 1, the compact was fired at 1,200° C. in an Ar atmosphere for 4 hours, to thereby yield a sintered body of the lithium-ion-conductive ceramic material (sample 4).
(Sample 5)

Differing from the case of sample 1, raw material powders were weighed so that the component proportions (by mole) Li:Mg:La:Sr:Zr were adjusted to 8.75:0.25:2.75:0.25:2.08. Then, a compact was formed through the same procedure as employ in the case of sample 1. The compact was covered with a calcination powder having the same composition as that of the compact. Similar to the case of sample 1, the compact was fired at 1,200° C. in air for 4 hours, to thereby yield a sintered body of the lithium-ion-conductive ceramic material (sample 5).
(Sample 6)

Differing from the case of sample 1, raw material powders were weighed so that the component proportions (by mole) Li:Mg:La:Sr:Zr were adjusted to 7.75:0.25:2.75:0.25:2.08. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 6).
(Sample 7)

Differing from the case of sample 1, raw material powders were weighed so that the component proportions (by mole) Li:Mg:La:Sr:Zr were adjusted to 7.75:0.25: 2.75:0.25:2.08. Then, a calcined material was produced through the same procedure as employ in the case of sample 1. Differing from the case of sample 1, the thus-obtained unfired material was mixed with a binder, and the mixture was subjected to pulverization by means of a ball mill with an organic solvent for 40 hours, followed by drying, to thereby yield an unfired material. Subsequently, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 7).
(Sample 8)

Differing from the case of sample 1, raw material powders were weighed so that the component proportions (by mole) Li:Mg:La:Sr:Zr were adjusted to 7.85:0.20:2.75:0.25:2.08. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 8).

(Sample 9)

Differing from the case of sample 1, raw material powders were weighed so that the component proportions (by mole) Li:Mg:La:Sr:Zr were adjusted to 8.05:0.05:2.85:0.15:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 9).

(Sample 10)

Differing from the case of sample 1, raw material powders were weighed so that the component proportions (by mole) Li:Mg:La:Sr:Zr were adjusted to 8.40:0.05:2.50:0.50:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 10).

(Sample 11)

Differing from the case of sample 1, raw material powders were weighed so that the component proportions (by mole) Li:Mg:La:Sr:Zr were adjusted to 7.35:0.40:2.85:0.15:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 11).

(Sample 12)

Differing from the case of sample 1, raw material powders were weighed so that the component proportions (by mole) Li:Mg:La:Sr:Zr were adjusted to 7.70:0.40:2.50:0.50:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 12).

(Sample 13)

Differing from the case of sample 1, raw material powders were weighed so that the component proportions (by mole) Li:Mg:La:Sr:Zr were adjusted to 7.95:0.15:2.75:0.25:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 13).

(Sample 14)

Differing from the case of sample 1, raw material powders were weighed so that the component proportions (by mole) Li:Mg:La:Sr:Zr were adjusted to 7.35:0.45:2.75:0.25:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 14).

(Sample 15)

Differing from the case of sample 1, raw material powders were weighed so that the component proportions (by mole) Li:Mg:La:Sr:Zr were adjusted to 8.00:0.00:3.00:0.00:2.07. Then, a compact was formed through the same procedure as employ in the case of sample 1. The compact was covered with a calcination powder having the same composition as that of the compact. Similar to the case of sample 1, the compact was fired at 1,200° C. in air for 4 hours, to thereby yield a sintered body of the lithium-ion-conductive ceramic material (sample 15).

(Sample 16)

Differing from the case of sample 1, raw material powders were weighed so that the component proportions (by mole) Li:Mg:La:Sr:Zr were adjusted to 8.00:0.00:3.00:0.00:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 16).

(Sample 17)

Differing from the case of sample 1, raw material powders were weighed so that the component proportions (by mole) Li:Mg:La:Sr:Zr were adjusted to 7.60:0.20:3.00:0.00:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 17).

(Sample 18)

Differing from the case of sample 1, raw material powders were weighed so that the component proportions (by mole) Li:Mg:La:Sr:Zr were adjusted to 7.20:0.40:3.00:0.00:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 18).

(Sample 19)

Differing from the case of sample 1, raw material powders were weighed so that the component proportions (by mole) Li:Mg:La:Sr:Zr were adjusted to 8.10:0.00:2.90:0.10:2.07. Then, a compact was formed through the same procedure as employ in the case of sample 1. The compact was covered with a calcination powder having the same composition as that of the compact. Differing from the case of sample 1, the compact was fired at 1,200° C. in a nitrogen atmosphere for 4 hours, to thereby yield a sintered body of the lithium-ion-conductive ceramic material (sample 19).

(Sample 20)

Powder-form raw materials of $Li_2CO_3$, MgO, $La(OH)_3$, $BaCO_3$, and $ZrO_2$ were weighed and mixed, such that the proportions (by mole) of Li, Mg, La, Ba, and Zr components Li:Mg:La:Ba:Zr were adjusted to 8.00:0.15:2.9:0.1:2.0 (sample 20). The resultant mixture was put into a pot made of Nylon with zirconia balls, and the mixture was pulverized by means of a ball mill with ethanol for 15 hours. The product was dried, to thereby yield a material mixture.

The thus-obtained material mixture was placed on an MgO plate and calcined at 1,100° C. for 10 hours, to thereby yield a calcined material. A binder was added to the calcined material, and the mixture was subjected to pulverization by a ball mill in an organic solvent for 15 hours, and the product was further dried, to thereby produce an unfired material. The unfired material was put into a metal mold having a diameter of 12 mm, and press-molded so as to have a product thickness of about 1.5 mm. The molded product was pressed at an isostatic pressure of 1.5 t/cm$^2$ by means of a cold isostatic pressing (CIP) machine, to thereby form a compact. The compact was covered with a calcination powder having the same composition as that of the compact and fired at 1,100° C. in a nitrogen atmosphere for 4 hours, to thereby yield a sintered body of the lithium-ion-conductive ceramic material (sample 20).

(Sample 21)

Differing from the case of sample 20, raw material powders were weighed so that the component proportions (by mole) Li:Mg:La:Ba:Zr were adjusted to 8.15:0.15:2.75:0.25:2.0. Then, a compact was formed through the same procedure as employ in the case of sample 20. The compact was covered with a calcination powder having the same composition as that of the compact. Similar to the case of sample 20, the compact was fired at 1,100° C. in a nitrogen atmosphere for 4 hours, to thereby yield a sintered body of the lithium-ion-conductive ceramic material (sample 21).

(Sample 22)

Powder-form raw materials of $Li_2CO_3$, MgO, $La(OH)_3$, $CaCO_3$, and $ZrO_2$ were weighed and mixed, such that the proportions (by mole) of Li, Mg, La, Ca, and Zr components Li:Mg:La:Ca:Zr were adjusted to 8.05:0.15:2.85:0.15:2.0 (sample 22). The resultant mixture was put into a pot made of Nylon with zirconia balls, and the mixture was pulverized by means of a ball mill with ethanol for 15 hours. The product was dried, to thereby yield a material mixture.

The thus-obtained material mixture was placed on an MgO plate and calcined at 1,100° C. for 10 hours, to thereby yield a calcined material. A binder was added to the calcined material, and the mixture was subjected to pulverization by a ball mill in an organic solvent for 15 hours, and the product was further dried, to thereby produce an unfired material. The unfired material was put into a metal mold having a diameter of 12 mm, and press-molded so as to have a product thickness of about 1.5 mm. The molded product was pressed at an isostatic pressure of 1.5 t/cm$^2$ by means of a cold isostatic pressing (CIP) machine, to thereby form a compact. The compact was covered with a calcination powder having the same composition as that of the compact and fired at 1,100° C. in a nitrogen atmosphere for 4 hours, to thereby yield a sintered body of the lithium-ion-conductive ceramic material (sample 22).

(Sample 23)

Differing from the case of sample 22, raw material powders were weighed so that the component proportions (by mole) Li:Mg:La:Ca:Zr were adjusted to 8.25:0.15:2.65:0.35:2.0. Then, a compact was formed through the same procedure as employ in the case of sample 22. The compact was covered with a calcination powder having the same composition as that of the compact. Similar to the case of sample 22, the compact was fired at 1,100° C. in a nitrogen atmosphere for 4 hours, to thereby yield a sintered body of the lithium-ion-conductive ceramic material (sample 23).

[XRD Analysis of Lithium-Ion-Conductive Ceramic Material]

Figure 3:
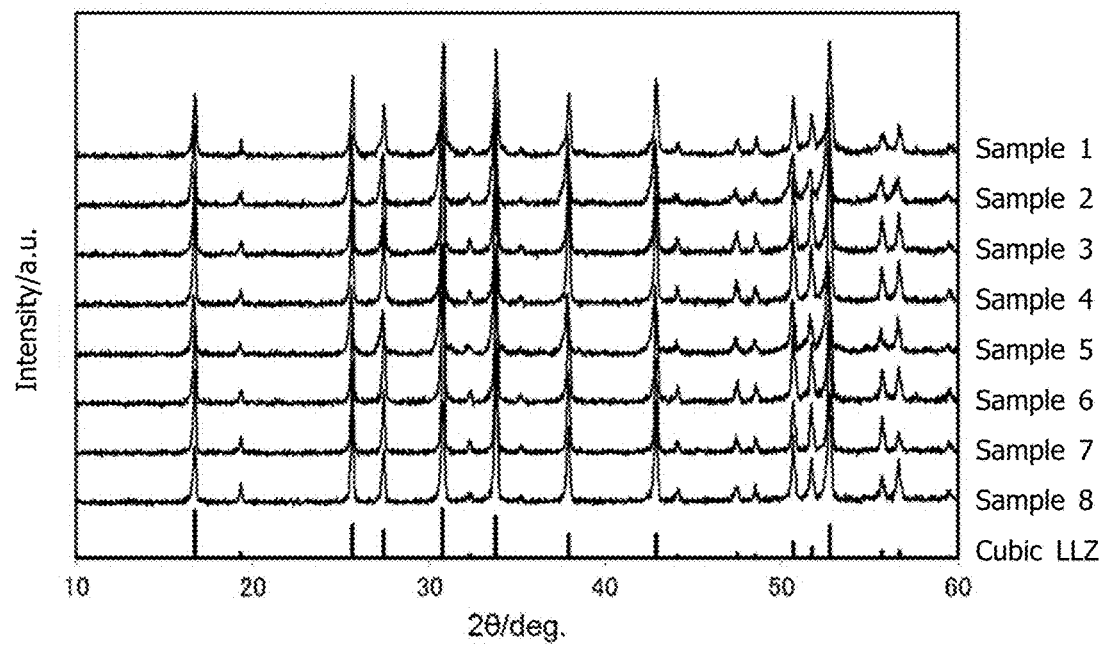
FIG. 3 shows X-ray diffraction patterns of samples 1 to 8, obtained through XRD analysis.
Figure 4:
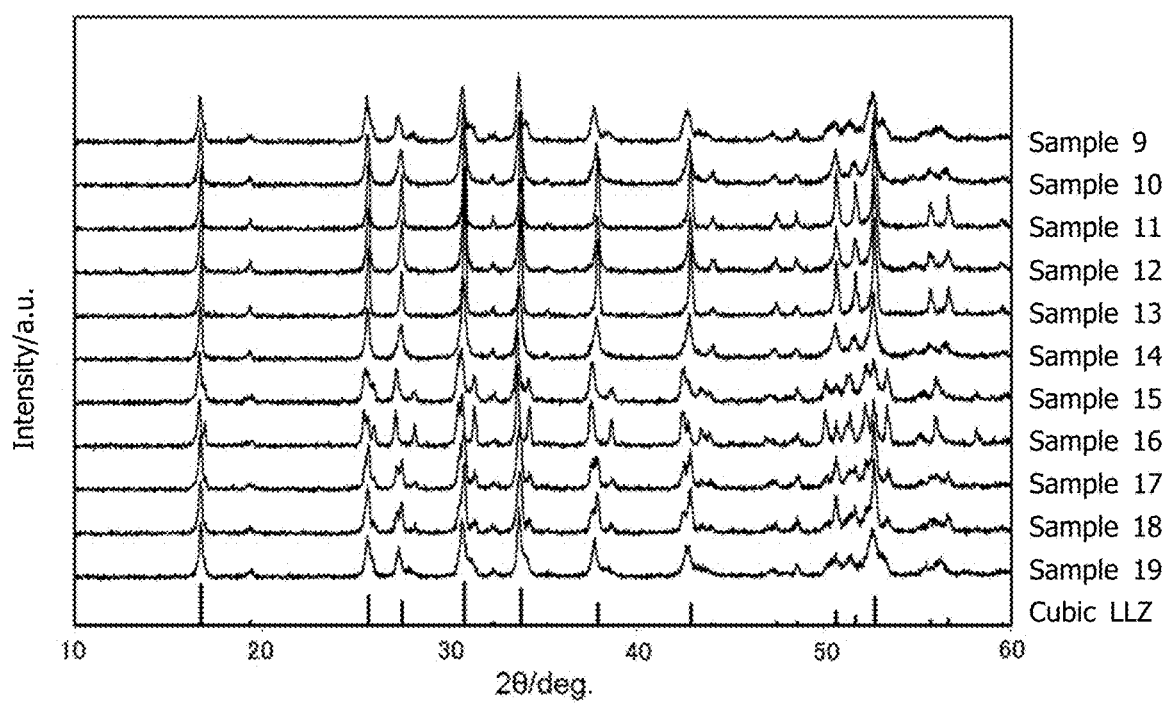
FIG. 4 shows X-ray diffraction patterns of samples 9 to 19, obtained through XRD analysis.

Each of the sintered body samples 1 to 23 was crushed, and the thus-obtained powder was analyzed by means of an X-ray diffractometer (XRD), to thereby obtain an X-ray diffraction pattern. FIGS. 3, 4, and 5 show the results of comparison of the thus-obtained X-ray diffraction pattern with a corresponding ICDD card. As shown in FIGS. 3, 4, and 5, samples 1 to 23 were found to be identified substantially with the ICDD card of LLZ (cubic). Therefore, it has been proven that samples 1 to 23 have a garnet-type or garnet-like crystal structure.

[ICP Analysis of Lithium-Ion-Conductive Ceramic Material]

Each of the sintered body samples 1 to 23 was crushed, and the thus-obtained powder was dissolved in a solvent such as an acid. The resultant solution was subjected to a compositional analysis by means of an ICP atomic emission spectrometer. ICP atomic emission spectroscopy was performed in accordance with JIS K 0116:2014. In Table 2, components which were not detected through ICP atomic emission spectroscopy due to the amounts thereof falling below corresponding detection limits are denoted by "<0.01." Tables 1 to 4 show the results.

[Relative Density]

The relative density was determined through the following procedure. Firstly, the mass of each of samples 1 to 23 in a dry state was measured by means of an electronic balance, and the volume of the sample was measured by means of vernier calipers. The thus-measured dry mass was divided by the volume, to thereby calculate the density of the sample. Separately, the theoretical density of each sample was calculated. Then, the relative density (%) was derived by dividing the determined density (×100) by the theoretical density. Tables 1 to 4 shows the results.

[Ion Conductivity]

Specific resistance and ion conductivity of each of samples 1 to 23 were determined. In a specific procedure, each main surface of each sample was polished, and the polished surface was coated with gold through sputtering. Specific resistance and ion conductivity of samples 1 to 23 were determined at room temperature through the AC impedance method by means of a multi-stat (1470E, product of Solartron) connected to a frequency-responsive analyzer (1255B, product of Solartron). Notably, the determined resistance R (specific resistance) is defined by the sum of intragrain resistance ra and grain boundary resistance rb (R=ra+rb). Ion conductivity Ic is the reciprocal of resistance R (Ic=1/R). Tables 1 and 2 show the results.

TABLE 1

| Sample No. | Composition (mol %) | | | | | Li/(La + Sr) | Mg/(La + Sr) | Sr/(La + Sr) | Firing atm. | Relative d. (%) | Li ion cond. (S/cm) |
|---|---|---|---|---|---|---|---|---|---|---|---|
| | Li | Mg | La | Sr | Zr | | | | | | |
| 1 | 6.34 | 0.20 | 2.75 | 0.28 | 1.88 | 2.09 | 0.066 | 0.092 | air | 92 | $3.5 \times 10^{-4}$ |
| 2 | 7.03 | 0.23 | 2.75 | 0.23 | 1.92 | 2.36 | 0.077 | 0.077 | reducing | 91 | $9.0 \times 10^{-4}$ |
| 3 | 6.81 | 0.22 | 2.75 | 0.23 | 1.91 | 2.29 | 0.074 | 0.077 | $N_2$ | 89 | $7.2 \times 10^{-4}$ |

TABLE 1-continued

| Sample No. | Composition (mol %) | | | | | Li/ (La + Sr) | Mg/ (La + Sr) | Sr/ (La + Sr) | Firing atm. | Relative d. (%) | Li ion cond. (S/cm) |
|---|---|---|---|---|---|---|---|---|---|---|---|
| | Li | Mg | La | Sr | Zr | | | | | | |
| 4 | 6.77 | 0.22 | 2.75 | 0.24 | 1.93 | 2.26 | 0.074 | 0.080 | Ar | 90 | $6.1 \times 10^{-4}$ |
| 5 | 6.65 | 0.23 | 2.75 | 0.25 | 1.99 | 2.22 | 0.077 | 0.083 | air | 87 | $2.6 \times 10^{-4}$ |
| 6 | 6.99 | 0.22 | 2.75 | 0.24 | 1.99 | 2.34 | 0.074 | 0.080 | $N_2$ | 90 | $7.1 \times 10^{-4}$ |
| 7 | 6.99 | 0.22 | 2.75 | 0.23 | 1.99 | 2.35 | 0.074 | 0.077 | $N_2$ | 91 | $1.0 \times 10^{-3}$ |
| 8 | 6.93 | 0.19 | 2.75 | 0.24 | 1.98 | 2.32 | 0.064 | 0.080 | $N_2$ | 89 | $9.6 \times 10^{-4}$ |

TABLE 2

| Sample No. | Composition (mol %) | | | | | Li/ (La + Sr) | Mg/ (La + Sr) | Sr/ (La + Sr) | Firing atm. | Relative d. (%) | Li ion cond. (S/cm) |
|---|---|---|---|---|---|---|---|---|---|---|---|
| | Li | Mg | La | Sr | Zr | | | | | | |
| 9 | 7.12 | 0.05 | 2.85 | 0.14 | 1.98 | 2.38 | 0.017 | 0.047 | $N_2$ | 89 | $1.2 \times 10^{-4}$ |
| 10 | 7.39 | 0.09 | 2.50 | 0.49 | 1.97 | 2.47 | 0.030 | 0.164 | $N_2$ | 86 | $7.3 \times 10^{-4}$ |
| 11 | 7.06 | 0.42 | 2.85 | 0.14 | 2.00 | 2.35 | 0.140 | 0.053 | $N_2$ | 91 | $7.4 \times 10^{-4}$ |
| 12 | 7.20 | 0.40 | 2.50 | 0.51 | 2.00 | 2.39 | 0.133 | 0.169 | $N_2$ | 90 | $6.4 \times 10^{-4}$ |
| 13 | 7.10 | 0.14 | 2.75 | 0.22 | 1.97 | 2.39 | 0.047 | 0.074 | $N_2$ | 92 | $1.1 \times 10^{-3}$ |
| 14 | 7.01 | 0.44 | 2.75 | 0.24 | 1.98 | 2.34 | 0.150 | 0.084 | $N_2$ | 90 | $1.5 \times 10^{-5}$ |
| 15 | 7.19 | <0.01 | 3.00 | <0.01 | 2.00 | 2.40 | — | — | air | 65 | $1.5 \times 10^{-7}$ |
| 16 | 7.19 | <0.01 | 3.00 | <0.01 | 2.00 | 2.40 | — | — | $N_2$ | 90 | $1.3 \times 10^{-7}$ |
| 17 | 7.07 | 0.19 | 3.00 | <0.01 | 2.01 | 2.36 | 0.063 | — | $N_2$ | 78 | $1.5 \times 10^{-7}$ |
| 18 | 6.96 | 0.37 | 3.00 | <0.01 | 2.02 | 2.32 | 0.123 | — | $N_2$ | 90 | $2.1 \times 10^{-7}$ |
| 19 | 7.18 | <0.01 | 2.90 | 0.10 | 1.98 | 2.39 | — | 0.033 | $N_2$ | 80 | $4.5 \times 10^{-6}$ |

TABLE 3

| Sample No. | Composition (mol %) | | | | | Li/ (La + Ba) | Mg/ (La + Ba) | Ba/ (La + Ba) | Firing atm. | Relative d. (%) | Li ion cond. (S/cm) |
|---|---|---|---|---|---|---|---|---|---|---|---|
| | Li | Mg | La | Ba | Zr | | | | | | |
| 20 | 7.53 | 0.14 | 2.90 | 0.06 | 2.01 | 2.54 | 0.047 | 0.020 | $N_2$ | 95 | $2.3 \times 10^{-5}$ |
| 21 | 7.37 | 0.14 | 2.75 | 0.18 | 2.02 | 2.52 | 0.048 | 0.061 | $N_2$ | 95 | $1.8 \times 10^{-5}$ |

TABLE 4

| Sample No. | Composition (mol %) | | | | | Li/ (La + Ca) | Mg/ (La + Ca) | Ca/ (La + Ca) | Firing atm. | Relative d. (%) | Li ion cond. (S/cm) |
|---|---|---|---|---|---|---|---|---|---|---|---|
| | Li | Mg | La | Ca | Zr | | | | | | |
| 22 | 7.44 | 0.13 | 2.85 | 0.15 | 2.02 | 2.48 | 0.043 | 0.050 | $N_2$ | 94 | $1.1 \times 10^{-5}$ |
| 23 | 7.68 | 0.14 | 2.65 | 0.33 | 2.02 | 2.58 | 0.047 | 0.111 | $N_2$ | 92 | $1.1 \times 10^{-5}$ |

As shown in Tables 1 to 4, lithium-ion-conductive ceramic material samples 1 to 14 and 20 to 23, which fall within the scope of the present invention, exhibited high ion conductivity of $1\times10^{-5}$ S/cm or higher. In contrast, lithium-ion-conductive ceramic material samples 15 to 19, which fall outside the scope of the present invention, exhibited an ion conductivity lower than $1\times10^{-5}$ S/cm, which was lower than the ion conductivity of samples 1 to 14 and 20 to 23. Also, lithium-ion-conductive ceramic material samples 1 to 13 exhibited an ion conductivity of $1\times10^{-4}$ S/cm or higher, which is higher than the ion conductivity of samples 14 to 23. Lithium-ion-conductive ceramic material samples 1 to 13 exhibited an ion conductivity of $1\times10^{-4}$ S/cm or higher, which is higher than the ion conductivity of samples 20 to 23. That is, lithium-ion-conductive ceramic material samples containing Sr exhibited an ion conductivity higher than that of those containing Ba or Ca.

Therefore, lithium-ion-conductive ceramic materials of samples 1 to 14 and 20 to 23 can be readily formed via sintering and exhibit high ion conductivity, even though the materials are derived partially from relatively inexpensive materials—Mg and Sr, Ba, or Ca—which are reserved in large amounts in the earth. Thus, cost reduction can be attained. Also, the lithium-ion-conductive ceramic material of the present invention is incorporated into at least one lithium battery member of the solid electrolyte layer, the cathode layer, the anode layer, and the protective layer. Thus, a high-performance lithium battery can be produced at reduced cost. Lithium-ion-conductive ceramic materials of samples 1 to 14 can be readily formed via sintering and exhibit high ion conductivity, even though the materials are derived partially from relatively inexpensive materials—Mg and Sr—which are reserved in large amounts in the earth. Thus, cost reduction can be attained.

Lithium-ion-conductive ceramic materials of samples 1 to 14 and 20 to 23 all had a relative density of 86% or higher. In the case where a solid electrolyte layer or a protective layer of a lithium battery is formed from any of lithium-ion-conductive ceramic materials of samples 1 to 14 and 20 to 23, having such a high relative density, the battery member can be formed into a thin film, whereby the internal resistance of the lithium battery can be reduced.

[Production of Lithium-Ion-Conductive Ceramic Sintered Body]

Powder-form raw materials of $Li_2CO_3$, MgO, $La(OH)_3$, $SrCO_3$, and $ZrO_2$ were weighed in the following manner. Specifically, $Li_2CO_3$ was added in a 10 mol % Li-excess amount, with respect to 1 mol of a theoretical composition: $Li_{6.95}Mg_{0.15}La_{2.75}Sr_{0.25}Zr_{2.0}O_{12}$, which is a crystalline compound having a garnet-type crystal structure to be formed via sintering. Subsequently, as shown in Table 5, MgO and $ZrO_2$ were further added such that the Mg amount and the Zr amount were to be 0 to 20 mol % excess. The thus-weighed powder mixture was put into a pot made of Nylon with zirconia balls, and the mixture was pulverized by means of a ball mill with ethanol for 15 hours. The product was dried, to thereby yield a material mixture.

The thus-obtained material mixture was placed on an MgO plate and calcined at 1,100° C. for 10 hours, to thereby yield a calcined material. A binder was added to the calcined material, and the mixture was subjected to pulverization by a ball mill in an organic solvent for 15 hours, and the product was further dried, to thereby produce an unfired material. The unfired material was put into a metal mold having a diameter of 12 mm, and press-molded so as to have a product thickness of about 1.5 mm. The molded product was pressed at an isostatic pressure of 1.5 t/cm$^2$ by means of a cold isostatic pressing (CIP) machine, to thereby form a compact. The compact was covered with a calcination powder having the same composition as that of the compact and fired at 1,200° C. in a nitrogen atmosphere for 4 hours, to thereby yield lithium-ion-conductive ceramic sintered body samples 24 to 28.

[SEM Observation of Lithium-Ion-Conductive Ceramic Sintered Body]

Figure 6A:
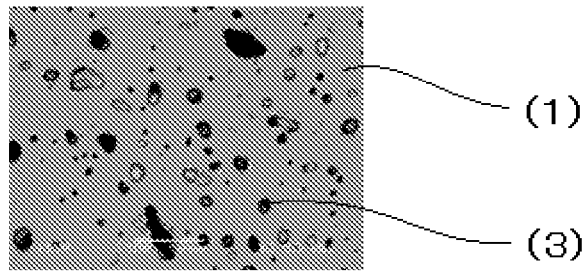
FIG. 6(a) is an SEM image of a polished surface of sample 20.
Figure 6B:
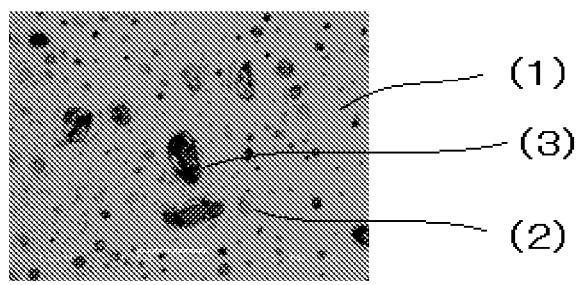
FIG. 6(b) is an SEM image of a polished surface of sample 21.
Figure 6C:
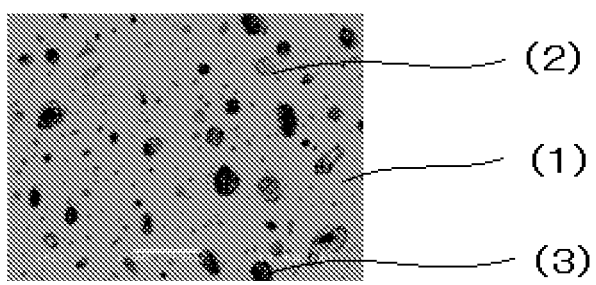
FIG. 6(c) is an SEM image of a polished surface of sample 22.
Figure 6D:
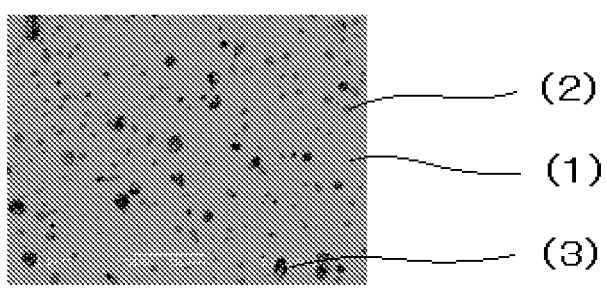
FIG. 6(d) is an SEM image of a polished surface of sample 23.
Figure 6E:
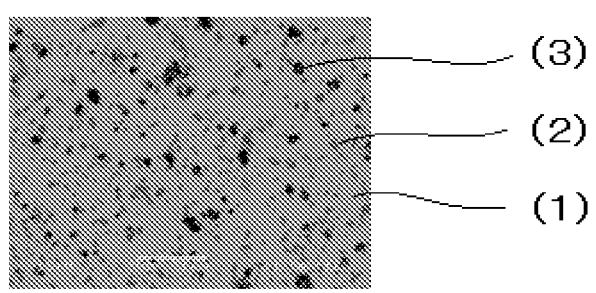
FIG. 6(e) is an SEM image of a polished surface of sample 24.

Each of samples 24 to 28 was cut to expose a cut surface, and the cut surface was polished. The polished surface was observed under a scanning electron microscope (SEM), and some images were taken (×500). FIG. 6(a) through FIG. 6(e) show the results. In the sintered body of sample 24 shown in FIG. 6(a), a large number of coarse pores (3) were observed, and no crystal phase other than a main crystal phase 1 was observed. In the sintered bodies of samples 25 to 28 shown in FIGS. 6(b) to 6(e), a second crystal phase (2) formed of small particles was dispersed in the first crystal phase (1), which is a main crystal phase, and a part of the second crystal phase (2) was present so as to fill the pores provided in the first crystal phase (1). Notably, FIG. 6(b) is a SEM image of sample 25, FIG. 6(c) is a SEM image of sample 26, FIG. 6(d) is a SEM image of sample 27, and FIG. 6(e) is a SEM image of sample 28.

Also, the total area of the second crystal phase (2) in the SEM image was determined through the aforementioned measurement from SEM images (×1,000) taken at 5 arbitrarily chosen sites. Subsequently, the ratio of the total area of the second crystal phase (2) to the total area of the SEM image was calculated. The arithmetical mean of the five calculated area ratios was obtained. Table 5 shows the results. As shown in Table 5 and FIG. 6(a) through FIG. 6(e), the second crystal phase (2) area ratio increased, as the amount of excess Mg or Zr increased.

Separately, SEM images (×1,000) were taken at 5 arbitrarily chosen sites, and the total area of coarse pores (3) having a maximum size of 10 μm or more was determined through the same method as employed in the determination of the area of the second crystal phase, to thereby calculate the ratio of the total area of the coarse pores (3) with respect to the total area of the SEM images. The arithmetical mean of the calculated area ratios was obtained. Table 3 shows the results. As shown in Table 5 and FIG. 6(a) through FIG. 6(e), the coarse pore (3) ratio decreased, as the amount of excess Mg or Zr increased.

The aforementioned coarse pores are conceived to be formed during a firing step via vaporization of Li. Since the area of the coarse pores decreases as an increase in the area of the second crystal phase, the second crystal phase is conceived to play a role in suppressing vaporization of Li.

[XRD Analysis of Lithium-Ion-Conductive Ceramic Sintered Body]

Figure 7:
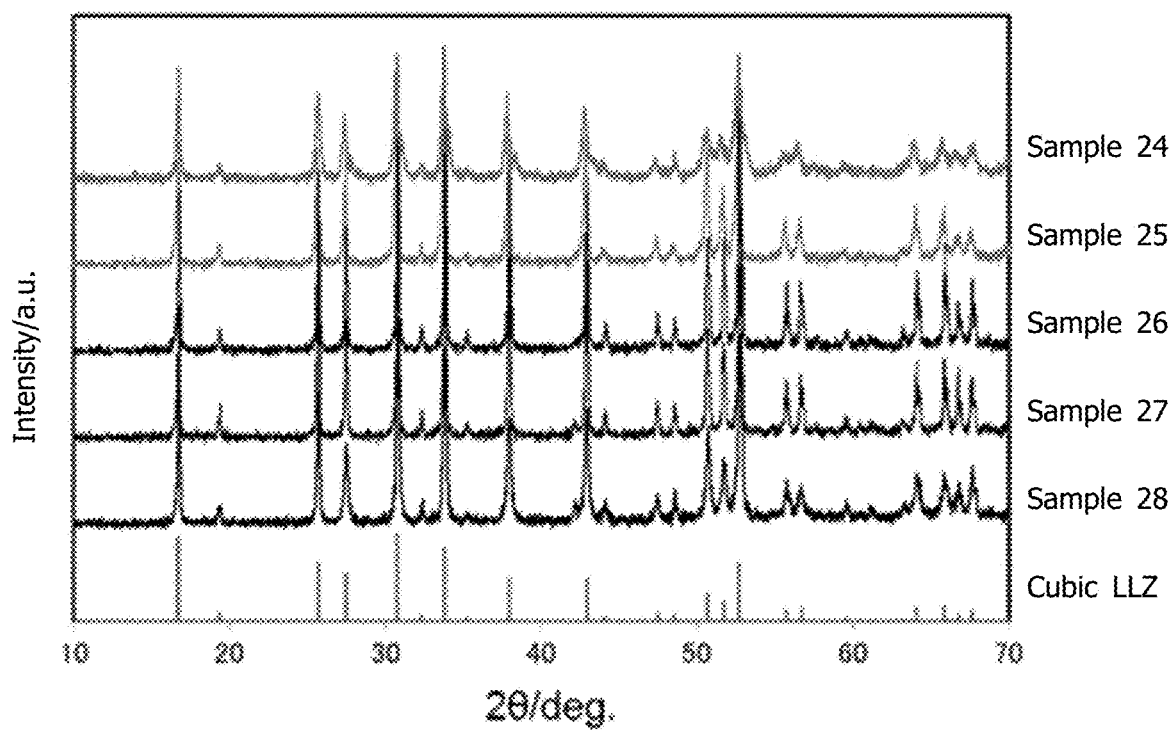
FIG. 7 shows X-ray diffraction patterns of samples 20 to 24, obtained through XRD analysis.

A powder obtained by crushing each of the sintered bodies of samples 24 to 28 was analyzed by means of an X-ray diffractometer (XRD), to thereby obtain an X-ray diffraction pattern. FIG. 7 shows the thus-obtained X-ray diffraction patterns, with reference to a related ICDD card. As shown in FIG. 7, the sintered bodies of samples 24 to 28 were found to coincide substantially with the ICDD card of cubic LLZ. Therefore, the sintered bodies of samples 24 to 28 were found to include crystals having a garnet-type or a garnet-like crystal structure.

[TEM-EDS Analysis of Lithium-Ion-Conductive Ceramic Sintered Body]

The aforementioned polished surface of each of samples 24 to 28 was analyzed by means of an energy dispersive X-ray spectrometer (EDS) attached to a transmission electron microscope (TEM). Specifically, the first crystal phase—a main crystal phase having the maximum surface area in the polished surface—was subjected to element analysis through EDS. As a result, the presence of Mg, La, Sr, Zr, and O, which were the components of added the raw material, was detected. In addition, the second crystal phase, which was formed of particles dispersed in the first crystal phase, was subjected to element analysis through EDS. As a result, the presence of Mg, Zr, and O was detected.

Separately, the second crystal phase formed of particles was irradiated with an electron beam, to thereby obtain an electron beam diffraction pattern. As a result, the second crystal phase was confirmed to be in a crystalline state.

[TOF-SIMS Analysis of Lithium-Ion-Conductive Ceramic Sintered Body]

The aforementioned polished surface of each of samples 24 to 28 was subjected to Li mapping through time-of-flight secondary ion mass spectrometry (TOF-SIMS). As a result, each of the first crystal phase and the second crystal phase was found to contain Li.

[Relative Density of Lithium-Ion-Conductive Ceramic Sintered Body]

The relative density of the sintered bodies of samples 24 to 28 was measured in the aforementioned manner. The relative density was obtained from the measured density and the theoretical density. As a result, all the sintered body samples were found to have a relative density of 86% or higher.

[Ion Conductivity]

Specific resistance and ion conductivity of each of samples 24 to 28 were determined. In a specific procedure, each main surface of each sample was polished, and the polished surface was coated with gold through sputtering. Specific resistance and ion conductivity of samples 24 to 28 were determined at room temperature through the AC impedance method by means of a multi-stat (1470E, product of Solartron) connected to a frequency-responsive analyzer (1255B, product of Solartron). Notably, the determined resistance R (specific resistance) is defined by the sum of intragrain resistance ra and grain boundary resistance rb (R=ra+rb). Ion conductivity Ic is the reciprocal of resistance R (Ic=1/R). Table 3 shows the results.

TABLE 5

| Sample No. | Excess Mg, Zr amount (mol %) | Area ratio of second crystal phase (%) | Area ratio of coarse pores (%) | Ion conductivity (S/cm) |
|---|---|---|---|---|
| 24 | 0 | 0 | 9.2 | $5.7 \times 10^{-4}$ |
| 25 | 1 | 0.5 | 7.0 | $1.2 \times 10^{-3}$ |
| 26 | 5 | 1.5 | 7.4 | $1.0 \times 10^{-3}$ |
| 27 | 10 | 2.7 | 2.3 | $1.1 \times 10^{-3}$ |
| 28 | 20 | 4.3 | 1.7 | $8.4 \times 10^{-4}$ |

As shown in Table 5, lithium-ion-conductive ceramic sintered body samples 25 to 28, which fall within the scope of the present invention, exhibited high ion conductivity of $8.4 \times 10^{-4}$ S/cm or higher. In contrast, the lithium-ion-conductive ceramic sintered body sample 24, which falls outside the scope of the present invention and included no second crystal phase, exhibited a lower ion conductivity, as compared with the ion conductivity of samples 25 to 28.

All the sintered body samples 25 to 28 had a second crystal phase containing Li, Mg, Zr, and O. Therefore, by virtue of the second crystal phase, volatilization of Li in the first crystal phase was conceivably prevented by volatilization of Li atoms preferentially from the second crystal phase during firing, whereby the ion conductivity was higher than that of sintered body sample 1. Also, a part of the second crystal phase was present so as to fill the coarse pores. Therefore, Li ion mobility was conceivably enhanced in the case where the coarse pores were filled with the second crystal phase, as compared with the case of vacant coarse pores, whereby the ion conductivity was higher than that of sintered body sample 24.

Also, samples 25 to 28, having a second crystal phase area ratio of 0.5% to 3%, had a ratio of the second crystal phase to the first crystal phase falling within the most preferred range. Thus, the ion conductivity thereof was higher than that of samples 24 and 28.

In the case where a solid electrolyte layer or a protective layer of a lithium battery was formed from any of lithium-ion-conductive ceramic sintered body samples 21 to 24 exhibiting high ion conductivity, the internal resistance of the lithium battery can be reduced, and a lithium battery having a high-capacity and output can be provided.

DESCRIPTION OF REFERENCE NUMERALS 10, 210 complete-solid battery
11, 211 solid electrolyte layer
12, 212 cathode layer
13, 213 anode layer
14, 214 first collector member
15, 215 second collector member
216 first protective layer
217 second protective layer

The invention claimed is:
1. A lithium-ion-conductive ceramic material which contains Li, La, and Zr, as well as Mg and A with A representing at least one element selected from the group consisting of Ca, Sr, and Ba, and the lithium-ion-conductive ceramic material having a cubic crystal structure, wherein the elements contained in the ceramic material satisfy the following mole ratio conditions (1') to (3'):

$$2.0 \leq Li/(La+A) \leq 2.7; \quad (1')$$

$$0.01 \leq Mg/(La+A) \leq 0.14; \text{ and} \quad (2')$$

$$0.04 \leq A/(La+A) \leq 0.17, \text{ and} \quad (3')$$

wherein the Mg and A are placed in a Li site and a La site, respectively, and
wherein the lithium-ion-conductive ceramic material has an ion conductivity at room temperature of $1.2 \times 10^{-4}$ S/cm or higher.

2. A lithium-ion-conductive ceramic material according to claim 1, which contains Li, La, Zr, Mg, and A.

3. A lithium-ion-conductive ceramic material according to claim 1, wherein A is Sr.

4. A lithium-ion-conductive ceramic material according to claim 1, which has a relative density of 86% or higher.

5. A lithium-ion-conductive ceramic sintered body which contains a lithium-ion-conductive ceramic material as recited in claim 1 and which has a first crystal phase containing Li and a second crystal phase containing Li, Mg, Zr, and O.

6. A lithium-ion-conductive ceramic sintered body according to claim 5, wherein the first crystal phase contains Li, La, Zr, and Mg.

7. A lithium-ion-conductive ceramic sintered body according to claim 5, wherein the first crystal phase contains Li, La, Zr, Mg, and element A with A representing at least one element selected from the group consisting of Ca, Sr, and Ba.

8. A lithium-ion-conductive ceramic sintered body according to claim 5, wherein element A is Sr.

9. A lithium-ion-conductive ceramic sintered body according to claim 5, which includes the second crystal phase at 10 area % or less, as determined in a cross-section of the sintered body.

10. A lithium battery comprising a solid electrolyte layer, a cathode layer, and an anode layer,
wherein at least one of the solid electrolyte layer, the cathode layer, and the anode layer contains a lithium-ion-conductive ceramic material as recited in claim 1.

11. A lithium battery comprising a solid electrolyte layer, a cathode layer, and an anode layer,
which further includes a protective layer between the solid electrolyte layer and the cathode layer, and/or between the solid electrolyte layer and the anode layer,
wherein at least one of the solid electrolyte layer, the cathode layer, the anode layer, and the protective layer contains a lithium-ion-conductive ceramic material as recited in claim 1.

12. A lithium battery comprising a lithium-ion-conductive ceramic sintered body as recited in claim 5, wherein the lithium-ion-conductive ceramic sintered body serves as a solid electrolyte layer or as a protective layer disposed between a solid electrolyte layer and an electrode.

13. The lithium-ion-conductive ceramic material according to claim 1, wherein the lithium-ion-conductive ceramic material does not include Nb.

14. The lithium-ion-conductive ceramic material according to claim 1, wherein A is Sr or Ca.

15. The lithium-ion-conductive ceramic material according to claim 1, wherein A is Sr.

* * * * *